US012719650B2

(12) United States Patent
Dai et al.

(10) Patent No.: US 12,719,650 B2
(45) Date of Patent: Aug. 25, 2026

(54) INFORMATION TRANSMISSION METHOD AND COMMUNICATION APPARATUS

(71) Applicant: HUAWEI TECHNOLOGIES CO., LTD., Shenzhen (CN)

(72) Inventors: Xizeng Dai, Beijing (CN); Jianghua Liu, Beijing (CN); Zheng Yu, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 549 days.

(21) Appl. No.: 18/158,109

(22) Filed: Jan. 23, 2023

(65) Prior Publication Data

US 2023/0163933 A1 May 25, 2023

Related U.S. Application Data

(63) Continuation of application No. PCT/CN2021/108540, filed on Jul. 27, 2021.

(30) Foreign Application Priority Data

Jul. 27, 2020 (CN) ......................... 202010734803.5

(51) Int. Cl.
*H04L 5/00* (2006.01)

(52) U.S. Cl.
CPC .................................. *H04L 5/0094* (2013.01)

(58) Field of Classification Search
CPC ..... H04L 5/0094; H04L 5/001; H04L 5/0098; H04W 72/20; H04W 72/0453
See application file for complete search history.

(56) References Cited

U.S. PATENT DOCUMENTS 10,129,889 B1 * 11/2018 Marupaduga ..... H04W 72/0453
2013/0163550 A1 6/2013 Marinier et al.
(Continued)

FOREIGN PATENT DOCUMENTS

CN 105376812 A 3/2016
CN 106413096 A 2/2017
(Continued)

OTHER PUBLICATIONS

Extended European Search Report issued in corresponding European Application No. 21850721.8, dated Nov. 8, 2023, pp. 1-10.
(Continued)

*Primary Examiner* — Austin J Moreau
(74) *Attorney, Agent, or Firm* — HAUPTMAN HAM, LLP

(57) ABSTRACT

Embodiments of this application disclose an information transmission method and a communication apparatus, to flexibly use spectrum resources. An embodiment of this application provides an information transmission method, including: receiving first configuration information from a second device, where the first configuration information instructs the second device to configure T uplink carriers for a first device, at least one element in a value set of T is a positive integer greater than L, and L is a maximum quantity of uplink carriers on which the first device can simultaneously perform uplink transmission; determining N uplink carriers from the T uplink carriers, where N is a positive integer less than or equal to L; and sending information on the N uplink carriers.

18 Claims, 5 Drawing Sheets

(56) References Cited

U.S. PATENT DOCUMENTS

2018/0006788 A1* 1/2018 Lee .......................... H04L 5/001
2019/0098607 A1 3/2019 Zhang et al.
2020/0100194 A1 3/2020 Nangia et al.
2022/0014321 A1* 1/2022 Lindoff ................... H04L 5/023

FOREIGN PATENT DOCUMENTS

CN 110391883 A 10/2019
CN 110611918 B * 1/2023 ............ H04W 72/23
EP 3331295 A1 * 6/2018 ........ H04W 72/0453

OTHER PUBLICATIONS

International Search Report issued in corresponding International Application No. PCT/CN2021/108540, dated Oct. 19, 2021, pp. 1-12.
Chinese First Office Action issued in corresponding Chinese Application No. 202511310828.1, dated Jun. 25, 2026, 1 pp. 1-10.

* cited by examiner

500
First device
501
502
Transceiver module
Processing module

INFORMATION TRANSMISSION METHOD AND COMMUNICATION APPARATUS

CROSS-REFERENCE TO RELATED APPLICATIONS

This application is a continuation of International Application No. PCT/CN2021/108540, filed on Jul. 27, 2021, which claims priority to Chinese Patent Application No. 202010734803.5, filed on Jul. 27, 2020. The disclosures of the aforementioned applications are hereby incorporated by reference in their entireties.

TECHNICAL FIELD

This application relates to the field of communication technologies, and in particular, to an information transmission method and a communication apparatus.

BACKGROUND

A mobile communication system may use a carrier aggregation (CA) mechanism to improve a signal transmission rate. For example, a downlink carrier aggregation manner may increase a downlink receiving rate.

In a current carrier aggregation scenario, spectrum resources cannot be flexibly used.

SUMMARY

Embodiments of this application provide an information transmission method and a communication apparatus, to flexibly use spectrum resources.

To resolve the foregoing technical problem, embodiments of this application provide the following technical solutions.

According to a first aspect, an embodiment of this application provides an information transmission method, including: receiving first configuration information from a second device, where the first configuration information instructs the second device to configure T uplink carriers for a first device, at least one element in a value set of T is a positive integer greater than L, and L is a maximum quantity of uplink carriers on which the first device can simultaneously perform uplink transmission; determining N uplink carriers from the T uplink carriers, where N is a positive integer less than or equal to L; and sending information on the N uplink carriers.

In the foregoing solution, the first device first receives the first configuration information from the second device. The second device may indicate, by using the first configuration information, to configure the T uplink carriers for the first device. The at least one element in the value set of T is a positive integer greater than L. For example, a value of T can be greater than a value of L. L is the maximum quantity of uplink carriers on which the first device can simultaneously perform uplink transmission, and L may represent a maximum quantity of uplink carriers that can be used by the first device for uplink transmission. That is, the first device can use a maximum of L uplink carriers during concurrent uplink transmission. After the first device determines that the second device configures the T uplink carriers for the first device, the first device may determine the N uplink carriers from the T uplink carriers. That is, the first device may select carriers from the T uplink carriers. T may be greater than L. Therefore, the first device may select carriers from carriers whose quantity exceeds the maximum quantity of uplink carriers for simultaneous transmission of the first device. N is a positive integer less than or equal to L. For example, a value of N is less than or equal to a value of L. Finally, the first device sends information on the N uplink carriers. This implements information transmission between the first device and the second device. In this embodiment of this application, the first device has a capability of flexibly selecting a carrier from more carriers beyond an uplink concurrency capability of the first device. In this way, the second device can configure more uplink carriers for the first device, and the first device flexibly selects a carrier from more carriers. Therefore, the first device can flexibly use spectrum resources.

In a possible implementation, the method further includes: reporting first capability information to the second device. The first capability information indicates that the first device can determine, from uplink carriers whose quantity is greater than L, an uplink carrier used for sending information; and/or the first capability information indicates that the first device can support determining, from a maximum of S uplink carriers, an uplink carrier used for sending information, and at least one element in a value set of S is a positive integer greater than L; and/or the first capability information indicates L. In the foregoing solution, the first device generates the first capability information, and sends the first capability information to the second device. The first capability information indicates an uplink carrier support capability of the first device, so that the second device determines the uplink carrier support capability of the first device based on the received first capability information. The second device may configure an actual quantity of uplink carriers for the first device based on the uplink carrier support capability of the first device.

In a possible implementation, the method further includes: receiving second configuration information from the second device, where the second configuration information instructs the second device to configure J downlink carriers for the first device, at least one element in a value set of J is a positive integer greater than K, and K is a maximum quantity of downlink carriers on which the first device can simultaneously perform downlink reception; determining W downlink carriers from the J downlink carriers, where W is a positive integer less than or equal to K; and receiving information on the W downlink carriers. In the foregoing solution, the first device has a capability of flexibly selecting a carrier from more carriers beyond a downlink concurrency capability of the first device. In this way, the second device can configure more downlink carriers for the first device, and the first device flexibly selects a carrier from more carriers. Therefore, the first device can flexibly use spectrum resources.

In a possible implementation, the method further includes: sending second capability information to the second device. The second capability information indicates that the first device can determine, from downlink carriers whose quantity is greater than K, a downlink carrier used for receiving information; and/or the second capability information indicates that the first device can determine, from a maximum of V downlink carriers, a downlink carrier used for receiving information, and at least one element in a value set of V is a positive integer greater than K; and/or the second capability information indicates K. In the foregoing solution, the first device generates the second capability information, and sends the second capability information to the second device. The second capability information indicates a downlink carrier support capability of the first device, so that the second device determines the downlink carrier support capability of the first device based on the received second capability information. The second device may configure an actual quantity of downlink carriers for the first device based on the downlink carrier support capability of the first device.

In a possible implementation, the determining N uplink carriers from the T uplink carriers includes: receiving third configuration information from the second device, where the third configuration information indicates an uplink carrier enabled by the second device for the first device and/or a quantity of uplink carriers enabled by the second device for the first device, and the quantity of uplink carriers enabled by the second device for the first device can be greater than L; and determining the N uplink carriers from uplink carriers enabled by the second device for the first device. In the foregoing solution, the third configuration information indicates the uplink carrier enabled by the second device for the first device and/or the quantity of uplink carriers enabled by the second device for the first device. For example, the third configuration information may directly indicate an uplink carrier enabled by the second device for the first device and/or a quantity of uplink carriers enabled by the second device for the first device, and the first device determines, based on the third configuration information, the quantity of uplink carriers enabled by the second device for the first device.

In a possible implementation, the determining W downlink carriers from the J downlink carriers includes: receiving fourth configuration information from the second device, where the fourth configuration information indicates a downlink carrier enabled by the second device for the first device and/or a quantity of downlink carriers enabled by the second device for the first device, and the quantity of downlink carriers enabled by the second device for the first device can be greater than K; and determining the W downlink carriers from downlink carriers enabled by the second device for the first device. In the foregoing solution, the fourth configuration information indicates the downlink carrier enabled by the second device for the first device and/or the quantity of downlink carriers enabled by the second device for the first device. For example, the fourth configuration information may directly indicate a downlink carrier enabled by the second device for the first device and/or a quantity of downlink carriers enabled by the second device for the first device. The first device determines, based on the fourth configuration information, the downlink carrier enabled by the second device for the first device and/or the quantity of downlink carriers enabled by the second device for the first device.

In a possible implementation, T is greater than J, and J is a quantity of downlink carriers configured by the second device for the first device; and/or L is greater than K, and K is a maximum quantity of downlink carriers on which the first device can simultaneously perform downlink reception. In the foregoing solution, in a possible implementation, the first capability information is used for enabling the second device to determine that the first device supports that the quantity of uplink carriers configured by the second device for the first device can be greater than L; and/or the first capability information is used for enabling the second device to determine that the maximum quantity of uplink carriers that can be configured by the second device for the first device is S; and/or, the first capability information is used for enabling the second device to determine that the maximum quantity of uplink carriers on which the first device can simultaneously perform uplink transmission is L. In the foregoing solution, specifically, the first capability information indicates that the first device can determine, from the uplink carriers whose quantity is greater than L, the uplink carrier used for sending information. In this way, the second device determines, based on the received first capability information, that the quantity of uplink carriers that the first device supports the second device to configure for the first device can be greater than L, and the second device may configure the uplink carrier for the first device based on the uplink carrier support capability of the first device. Specifically, the first capability information indicates that the first device can support determining, from the maximum of S uplink carriers, the uplink carrier used for sending information. In this way, the second device determines, based on the received first capability information, that the maximum quantity of uplink carriers that the first device can support the second device to configure for the first device is S, and the second device may configure the uplink carrier for the first device based on the uplink carrier support capability of the first device. Specifically, the first capability information indicates L, so that the second device determines, based on the received first capability information, that the maximum quantity of uplink carriers on which the first device can simultaneously perform uplink transmission is L, and the second device may configure, for the first device based on the uplink carrier support capability of the first device, that an actual quantity of concurrent uplink carriers does not exceed L.

In a possible implementation, the second device can configure a maximum of M uplink carriers for the first device, and M is a positive integer greater than L. In the foregoing solution, the second device can configure the maximum of M uplink carriers for the first device. That is, the second device has a capability of configuring the maximum quantity of M uplink carriers for the first device, and M is greater than L. For example, a value of L is 2, and a value of M may be 5. Optionally, the first configuration information may indicate the second device to configure the maximum of M uplink carriers for the first device. In other words, the first configuration information can be used for configuring the maximum of M uplink carriers for user equipment. The maximum quantity of uplink carriers on which the first device can simultaneously perform uplink transmission is L. M is a positive integer greater than 1, and L is a positive integer less than M.

In a possible implementation, M is greater than Q, and Q is a maximum quantity of downlink carriers that can be configured by the second device for the first device. In the foregoing solution, M is greater than Q. In other words, uplink and downlink carriers do not need to be paired. This resolves a limitation on spectrum resource utilization. A maximum quantity of carriers for concurrent downlink reception of the user equipment is less than a maximum quantity of concurrent uplink carriers of the user equipment. This does not increase complexity of the user equipment, is applicable to an uplink-dominant service and meets a requirement of the user equipment for more uplink carriers.

According to a second aspect, an embodiment of this application further provides an information transmission method, including: sending first configuration information to a first device, where the first configuration information instructs a second device to configure T uplink carriers for the first device, at least one element in a value set of T is a positive integer greater than L, and L is a maximum quantity of uplink carriers on which the first device can simultaneously perform uplink transmission; and determining N uplink carriers from the T uplink carriers, where N is a positive integer less than or equal to L, and the N uplink carriers are used for receiving information from the first device. In the foregoing solution, the first device has a capability of flexibly selecting a carrier from more carriers beyond an uplink concurrency capability of the first device. In this way, the second device can configure more uplink carriers for the first device, and the first device flexibly selects a carrier from more carriers. Therefore, the first device can flexibly use spectrum resources.

In a possible implementation, the method further includes: receiving first capability information from the first device; and determining, based on the first capability information, that the first device can determine, from uplink carriers whose quantity is greater than L, an uplink carrier used for sending information; and/or determining, based on the first capability information, that the first device can support determining, from a maximum of S uplink carriers, an uplink carrier used for sending information, and at least one element in a value set of S is a positive integer greater than L; and/or determining L based on the first capability information. In the foregoing solution, the first device generates the first capability information, and sends the first capability information to the second device. The first capability information indicates an uplink carrier support capability of the first device, so that the second device determines the uplink carrier support capability of the first device based on the received first capability information. The second device may configure an actual quantity of uplink carriers for the first device based on the uplink carrier support capability of the first device.

In a possible implementation, the method further includes: sending second configuration information to the first device, where the second configuration information instructs the second device to configure J downlink carriers for the first device, at least one element in a value set of J is a positive integer greater than K, and K is a maximum quantity of downlink carriers on which the first device can simultaneously perform downlink reception; and determining W downlink carriers from the J downlink carriers, where W is a positive integer less than or equal to K, and the W downlink carriers are used for sending information. In the foregoing solution, the first device has a capability of flexibly selecting a carrier from more carriers beyond a downlink concurrency capability of the first device. In this way, the second device can configure more downlink carriers for the first device, and the first device flexibly selects a carrier from more carriers. Therefore, the first device can flexibly use spectrum resources.

In a possible implementation, the method further includes: receiving second capability information from the first device; and determining, based on the second capability information, that the first device can determine, from downlink carriers whose quantity is greater than K, a downlink carrier used for receiving information; and/or determining, based on the second capability information, that the first device can determine, from a maximum of V downlink carriers, a downlink carrier used for receiving information, and at least one element in a value set of V is a positive integer greater than K; and/or determining K based on the second capability information. In the foregoing solution, the first device generates the second capability information, and sends the second capability information to the second device. The second capability information indicates a downlink carrier support capability of the first device, so that the second device determines the downlink carrier support capability of the first device based on the received second capability information. The second device may configure an actual quantity of downlink carriers for the first device based on the downlink carrier support capability of the first device.

In a possible implementation, the method further includes: sending third configuration information to the first device, where the third configuration information indicates an uplink carrier enabled by the second device for the first device and/or a quantity of uplink carriers enabled by the second device for the first device, and the quantity of uplink carriers enabled by the second device for the first device can be greater than L. In the foregoing solution, the third configuration information indicates the uplink carrier enabled by the second device for the first device and/or the quantity of uplink carriers enabled by the second device for the first device. For example, the third configuration information may directly indicate an uplink carrier enabled by the second device for the first device and/or a quantity of uplink carriers enabled by the second device for the first device, and the first device determines, based on the third configuration information, the quantity of uplink carriers enabled by the second device for the first device.

In a possible implementation, the method further includes: sending fourth configuration information to the first device, where the fourth configuration information indicates a downlink carrier enabled by the second device for the first device and/or a quantity of downlink carriers enabled by the second device for the first device, and the quantity of downlink carriers enabled by the second device for the first device can be greater than K. In the foregoing solution, the fourth configuration information indicates the downlink carrier enabled by the second device for the first device and/or the quantity of downlink carriers enabled by the second device for the first device. For example, the fourth configuration information may directly indicate a downlink carrier enabled by the second device for the first device and/or a quantity of downlink carriers enabled by the second device for the first device. The first device determines, based on the fourth configuration information, the downlink carrier enabled by the second device for the first device and/or the quantity of downlink carriers enabled by the second device for the first device.

In a possible implementation, T is greater than J, and J is a quantity of downlink carriers configured by the second device for the first device; and/or L is greater than K, and K is a maximum quantity of downlink carriers on which the first device can simultaneously perform downlink reception. In the foregoing solution, in a possible implementation, the second capability information is used for enabling the second device to determine that the first device supports that the quantity of downlink carriers configured by the second device for the first device can be greater than K; and/or the second capability information is used for enabling the second device to determine that the first device can support that the maximum quantity of downlink carriers configured by the second device for the first device is V; and/or, the second capability information is used for enabling the second device to determine that the maximum quantity of downlink carriers on which the first device can simultaneously perform downlink reception is K. In the foregoing solution, specifically, the second capability information indicates that the first device can determine, from the downlink carriers whose quantity is greater than K, the downlink carrier used for sending information. Therefore, the second device determines, based on the received second capability information, that the quantity of downlink carriers that the first device supports the second device to configure for the first device can be greater than K, and the second device may configure an actual quantity of downlink carriers for the first device based on the downlink carrier support capability of the first device. Specifically, the second capability information indicates that the first device can support determining, from the maximum of V downlink carriers, the downlink carrier used for sending information. In this way, the second device determines, based on the received second capability information, that the maximum quantity of downlink carriers that the first device can support the second device to configure for the first device is V, and the second device may configure the actual quantity of downlink carriers for the first device based on the downlink carrier support capability of the first device. Specifically, the second capability information indicates K, so that the second device determines, based on the received second capability information, that the maximum quantity of downlink carriers on which the first device can simultaneously perform downlink reception is K. The second device may configure the actual quantity of downlink carriers for the first device based on the downlink carrier support capability of the first device. Specifically, the first capability information indicates that the first device can support determining, from a maximum of B enabled downlink carriers, a downlink carrier used for receiving information. For example, B is a positive integer greater than K. Enabling means that the second device activates a downlink carrier, or the second device configures a downlink carrier to enable the carrier to be used by the first device. Based on the first capability information, the second device may determine that the first device can support the maximum of B enabled downlink carriers, and the second device may determine, from the maximum of B enabled downlink carriers, a downlink carrier available to the first device.

In a possible implementation, the second device can configure a maximum of Q downlink carriers for the first device, and Q is a positive integer greater than K. In the foregoing solution, the second device can configure the maximum of Q downlink carriers for the first device. That is, the second device has a capability of configuring the maximum quantity of Q downlink carriers for the first device, and Q is greater than K. For example, a value of K is 3, and a value of Q may be 4. Optionally, the first configuration information may indicate that the second device can configure the maximum of Q downlink carriers for the first device. In other words, the first configuration information can be used for configuring the maximum of Q downlink carriers for user equipment, and the maximum quantity of downlink carriers on which the first device can simultaneously perform downlink reception is K. Q is a positive integer greater than 1, and K is a positive integer less than Q.

According to a third aspect, an embodiment of this application further provides a communication apparatus. The communication apparatus is a first device, and the first device includes a transceiver module, configured to receive first configuration information from a second device, where the first configuration information instructs the second device to configure T uplink carriers for the first device, at least one element in a value set of T is a positive integer greater than L, and L is a maximum quantity of uplink carriers on which the first device can simultaneously perform uplink transmission; a processing module, configured to determine N uplink carriers from the T uplink carriers, where N is a positive integer less than or equal to L; and the transceiver module, configured to send information on the N uplink carriers.

In a possible implementation, the transceiver module is configured to report first capability information to the second device. The first capability information indicates that the first device can determine, from uplink carriers whose quantity is greater than L, an uplink carrier used for sending information; and/or the first capability information indicates that the first device can support determining, from a maximum of S uplink carriers, an uplink carrier used for sending information, and at least one element in a value set of S is a positive integer greater than L; and/or the first capability information indicates L.

In a possible implementation, the transceiver module is configured to receive second configuration information from the second device, where the second configuration information instructs the second device to configure J downlink carriers for the first device, at least one element in a value set of J is a positive integer greater than K, and K is a maximum quantity of downlink carriers on which the first device can simultaneously perform downlink reception; the processing module is configured to determine W downlink carriers from the J downlink carriers, where W is a positive integer less than or equal to K; and the transceiver module is configured to receive information on the W downlink carriers.

In a possible implementation, the transceiver module is configured to send second capability information to the second device. The second capability information indicates that the first device can determine, from downlink carriers whose quantity is greater than K, a downlink carrier used for receiving information; and/or the second capability information indicates that the first device can determine, from a maximum of V downlink carriers, a downlink carrier used for receiving information, and at least one element in a value set of V is a positive integer greater than K; and/or the second capability information indicates K.

In a possible implementation, the transceiver module is configured to receive third configuration information from the second device, where the third configuration information indicates an uplink carrier enabled by the second device for the first device and/or a quantity of uplink carriers enabled by the second device for the first device, and the quantity of uplink carriers enabled by the second device for the first device can be greater than L; and the processing module is configured to determine the N uplink carriers from uplink carriers enabled by the second device for the first device.

In a possible implementation, the transceiver module is configured to receive fourth configuration information from the second device, where the fourth configuration information indicates a downlink carrier enabled by the second device for the first device and/or a quantity of downlink carriers enabled by the second device for the first device, and the quantity of downlink carriers enabled by the second device for the first device can be greater than K; and the processing module is configured to determine the W downlink carriers from downlink carriers enabled by the second device for the first device.

In a possible implementation, T is greater than J, and J is a quantity of downlink carriers configured by the second device for the first device; and/or L is greater than K, and K is a maximum quantity of downlink carriers on which the first device can simultaneously perform downlink reception.

In the third aspect of this application, the modules constituting the communication apparatus may further perform the steps described in the first aspect and the possible implementations of the first aspect. For details, refer to the descriptions in the first aspect and the possible implementations of the first aspect.

According to a fourth aspect, an embodiment of this application further provides a communication apparatus. The communication apparatus is a second device, and the second device includes a transceiver module, configured to send first configuration information to a first device, where the first configuration information instructs the second device to configure T uplink carriers for the first device, at least one element in a value set of T is a positive integer greater than L, and L is a maximum quantity of uplink carriers on which the first device can simultaneously perform uplink transmission; and a processing module, configured to determine N uplink carriers from the T uplink carriers, where N is a positive integer less than or equal to L, and the N uplink carriers are used for receiving information from the first device.

In a possible implementation, the transceiver module is configured to receive first capability information from the first device; and the processing module is configured to determine, based on the first capability information, that the first device can determine, from uplink carriers whose quantity is greater than L, an uplink carrier used for sending information; and/or determine, based on the first capability information, that the first device can support determining, from a maximum of S uplink carriers, an uplink carrier used for sending information, and at least one element in a value set of S is a positive integer greater than L; and/or determine L based on the first capability information.

In a possible implementation, the transceiver module is configured to send second configuration information to the first device, where the second configuration information instructs the second device to configure J downlink carriers for the first device, at least one element in a value set of J is a positive integer greater than K, and K is a maximum quantity of downlink carriers on which the first device can simultaneously perform downlink reception; and the processing module is configured to determine W downlink carriers from the J downlink carriers, where W is a positive integer less than or equal to K, and the W downlink carriers are used for sending information.

In a possible implementation, the transceiver module is configured to receive second capability information from the first device; and the processing module is configured to determine, based on the second capability information, that the first device can determine, from downlink carriers whose quantity is greater than K, a downlink carrier used for receiving information; and/or determine, based on the second capability information, that the first device can determine, from a maximum of V downlink carriers, a downlink carrier used for receiving information, and at least one element in a value set of V is a positive integer greater than K; and/or determine K based on the second capability information.

In a possible implementation, the transceiver module is configured to send third configuration information to the first device, where the third configuration information indicates an uplink carrier enabled by the second device for the first device and/or a quantity of uplink carriers enabled by the second device for the first device, and the quantity of uplink carriers enabled by the second device for the first device can be greater than L.

In a possible implementation, the transceiver module is configured to send fourth configuration information to the first device, where the fourth configuration information indicates a downlink carrier enabled by the second device for the first device and/or a quantity of downlink carriers enabled by the second device for the first device, and the quantity of downlink carriers enabled by the second device for the first device can be greater than K.

In a possible implementation, T is greater than J, and J is a quantity of downlink carriers configured by the second device for the first device; and/or L is greater than K, and K is a maximum quantity of downlink carriers on which the first device can simultaneously perform downlink reception.

In the fourth aspect of this application, the modules constituting the communication apparatus may further perform the steps described in the second aspect and the possible implementations of the second aspect. For details, refer to the descriptions in the second aspect and the possible implementations of the second aspect.

According to a fifth aspect, an embodiment of this application provides a computer-readable storage medium. The computer-readable storage medium stores instructions. When the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communication apparatus. The communication apparatus may include an entity such as a first device, a second device, or a chip. The communication apparatus includes a processor and a memory. The memory is configured to store instructions. The processor is configured to execute the instructions in the memory, so that the communication apparatus performs the method according to any one of the first aspect or the second aspect.

According to an eighth aspect, this application provides a chip system. The chip system includes a processor, configured to support a first device or a second device in implementing functions in the foregoing aspects, for example, sending or processing data and/or information in the foregoing methods. In a possible design, the chip system further includes a memory. The memory is configured to store a program instruction and data that are necessary for the first device or the second device. The chip system may include a chip, or may include a chip and another discrete component.

According to a ninth aspect, this application provides a communication system. The communication system includes the first device according to the first aspect and the second device according to the second aspect.

DESCRIPTION OF EMBODIMENTS

Figure 1:
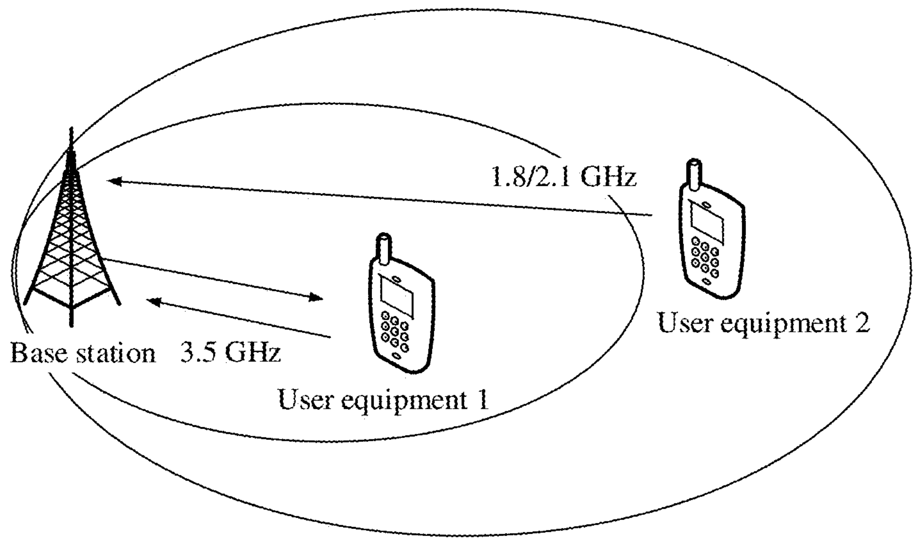
FIG. 1 is a schematic diagram of using a carrier during communication between a base station and user equipment according to an embodiment of this application.

Embodiments of this application provide an information transmission method and a communication apparatus, to flexibly use spectrum resources.

The following describes embodiments of this application with reference to accompanying drawings.

Technical solutions provided in embodiments of this application may be applied to various communication systems, for example, a long term evolution (LTE) system, a 5G mobile communication system, a wireless fidelity (Wi-Fi) system, a future communication system, or a system integrating a plurality of communication systems. This is not limited in embodiments of this application. 5G may also be referred to as a new radio interface (NR).

The technical solutions provided in embodiments of this application may be applied to various communication scenarios, for example, applied to one or more of the following communication scenarios: eMBB, URLLC, mMTC, device-to-device (D2D) communication, vehicle-to-everything (V2X) communication, vehicle-to-vehicle (V2V) communication, internet of things (IoT), and the like.

A wireless communication system includes communication devices, and the communication devices may perform wireless communication over an air interface resource. The communication device may include a network device and a terminal device, and the network device may also be referred to as a network-side device. The air interface resource may include at least one of a time domain resource, a frequency domain resource, a code resource, and a spatial resource. In embodiments of this application, "at least one" may also be described as "one or more", and "a plurality of" may be "two, three, four, or more". This is not limited in this application. For example, the wireless communication system includes two communication devices: a first device and a second device. The first device may be referred to as a first communication device, and the second device may be referred to as a second communication device. The first communication device may be a terminal device, and the second communication device may be a network device. Alternatively, the first communication device may be a first terminal device, and the second communication device may be a second terminal device.

In embodiments of this application, transmission may be sending or receiving. If transmission is sending, a peer device that communicates with a device sending information performs information receiving. If transmission is receiving, a peer device that communicates with a device receiving information performs information sending.

The step descriptions and examples in embodiments of this application do not mean that each step is mandatory during implementation of the method in embodiments of this application, and do not limit or restrict a sequence of the steps during implementation of the method in embodiments of this application.

In embodiments of this application, "/" may represent an "or" relationship between associated objects. For example, AB may represent A or B. However, in calculation according to a formula, "/" may represent a division symbol. For example, N/M represents N divided by M, and N and M each represent a value. The term "and/or" may be used to describe that three relationships exist between associated objects. For example, A and/or B may represent the following three cases: Only A exists, both A and B exist, and only B exists, where A and B may be singular or plural. To facilitate description of the technical solutions in embodiments of this application, words such as "first", "second", "A", and "B" in embodiments of this application may be used to distinguish between technical features with a same or similar function. The words such as "first", "second", "A", and "B" do not limit a quantity and an execution sequence, and the words such as "first", "second", "A", and "B" do not indicate a definite difference either. In embodiments of this application, the word such as "example" or "for example" is used to represent an example, an illustration, or a description, and is described as "example" or "for example". Any embodiment or design scheme should not be explained as being more preferred or having more advantages than another embodiment or design scheme. Use of the terms such as "example" or "for example" is intended to present a related concept in a specific manner for ease of understanding.

The terminal device in embodiments of this application may also be referred to as a terminal, and may be a device having a wireless transceiver function. The terminal device may be deployed on land, including an indoor device, an outdoor device, a handheld device, or a vehicle-mounted device; may be deployed on the surface of water (such as in a steamship); or may be deployed in the air (such as on an airplane, a balloon, or a satellite). The terminal device may be user equipment (UE). The UE includes a handheld device, a vehicle-mounted device, a wearable device, or a computing device having a wireless communication function. For example, the UE may be a mobile phone, a tablet computer, or a computer with a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus configured to implement a function of the terminal device may be a terminal device, or may be an apparatus, for example, a chip system, that can support a terminal device in implementing the function. The apparatus may be deployed on the terminal device, or may be used together with the terminal device. In this embodiment of this application, the chip system may include a chip, or may include a chip and another discrete component. In embodiments of this application, an example in which the apparatus configured to implement the function of the terminal device is a terminal device is used to specifically describe the technical solutions provided in embodiments of this application.

The terminal device in the mMTC scenario may be a reduced-capability terminal device. The reduced-capability terminal device may also be referred to as a light terminal device. For example, compared with a conventional terminal device, a (reduced capability (REDCAP)) terminal device in an NR system has a lower capability. For example, compared with a conventional terminal device, a REDCAP terminal device has one or more of the following features: a narrower supported bandwidth, a smaller quantity of configured antennas, smaller maximum supported transmit power, a lower supported duplex capability (for example, the conventional terminal device supports full-duplex frequency division duplex, and the REDCAP terminal device supports half-duplex frequency division duplex), and a weaker data processing capability (for example, the REDCAP terminal device can process less data than a conventional terminal device within a same period, or the REDCAP terminal device takes a longer period to process same data than the conventional terminal device). Therefore, the REDCAP terminal device and the conventional terminal device may need different system information, a dedicated access network, and/or control channels with different performance, and the like. The conventional terminal device may be a non-REDCAP terminal device, and the non-REDCAP terminal device mainly supports an enhanced mobile broadband (eMBB) service and/or an ultra-reliable and low latency communication (URLLC) service. Compared with the REDCAP terminal device, the conventional terminal device may be considered as a high-capability terminal device or a terminal device whose capability is not limited. Optionally, the conventional terminal device may be replaced with a terminal device that is introduced in the future and that has a high capability compared with the REDCAP terminal device.

The network device provided in embodiments of this application may include a base station (BS), and may be a device that is deployed in a radio access network and that can perform wireless communication with a terminal device. The base station may have a plurality of forms, for example, an access point such as a macro base station, a micro base station, a relay station, a satellite, an uncrewed aerial vehicle, or an airplane. For example, the base station in embodiments of this application may be a base station in a 5G mobile communication system and an evolved system thereof, or a base station in LTE. A base station in the 5G mobile communication system may alternatively be referred to as a transmission reception point (TRP) or a gNB. In embodiments of this application, an apparatus configured to implement a function of the network device may be a network device, or may be an apparatus, for example, a chip system, that can support a network device in implementing the function. The apparatus may be deployed on the network device, or may be used together with the network device. In embodiments of this application, an example in which the apparatus configured to implement the function of the network device is a network device is used to specifically describe the technical solutions provided in embodiments of this application.

The technical solutions provided in embodiments of this application may be applied to wireless communication between communication devices. The wireless communication between communication devices may include wireless communication between the network device and the terminal device, wireless communication between network devices, and wireless communication between terminal devices. In embodiments of this application, the term "wireless communication" may be referred to as "communication" for short, and the term "communication" may also be described as "data transmission", "information transmission", or "transmission". The technical solution may be used for wireless communication between a scheduling entity and a subordinate entity. The scheduling entity may allocate a resource to the subordinate entity. A person skilled in the art may use the technical solutions provided in embodiments of this application to perform wireless communication between another scheduling entity and a subordinate entity, for example, wireless communication between a macro base station and a micro base station, and wireless communication between a first-type terminal device and a second-type terminal device. The first-type terminal device and the second-type terminal device may indicate two different types of terminal devices. For example, the first-type terminal device may be a terminal device used in an industrial wireless sensor network (IWSN), and the second-type terminal device may be a terminal device used in video surveillance. Alternatively, the first-type terminal device may be a capability-reduced terminal device of a type 1, and the second-type terminal device may be a capability-reduced terminal device of a type 2 and a non-capability-reduced terminal device. For another example, the first-type terminal device may be a terminal device configured for an industrial wireless sensor network, and the second-type terminal device may be a terminal device configured for video surveillance and an enhanced mobile broadband (eMBB) terminal device.

In a mobile communication system, a propagation distance (or coverage) of a signal is usually inversely proportional to a frequency of a communication frequency band. That is, a higher frequency band or frequency channel number used in a mobile communication system indicates a shorter propagation distance (or coverage). For example, a propagation distance (or coverage) corresponding to a 3.5 gigahertz (GHz) frequency band used by a mobile communication system is usually less than a propagation distance (or coverage) corresponding to a 1.8 GHz frequency band. Thanks to a multi-antenna transmission and multi-antenna reception technology adopted by a communication device, the propagation distance (or coverage) of the signal may be further increased. Carriers used in the mobile communication system may be classified into an uplink (UL) carrier and a downlink (DL) carrier, and coverage of the downlink carrier is generally better than coverage of the uplink carrier.

FIG. 1 is a schematic diagram of using a carrier during communication between a base station and user equipment according to an embodiment of this application. For example, when the base station performs communication by using a 3.5 GHz frequency band, coverage of a downlink carrier is usually better than coverage of an uplink carrier. To ensure coverage performance of the user equipment, for example, when coverage of the user equipment is poor, uplink transmission of the user equipment may be switched from a 3.5 GHz frequency band to a low frequency band (for example, 1.8 GHz or 2.1 GHz), to obtain better coverage of an uplink carrier.

Figure 2A:
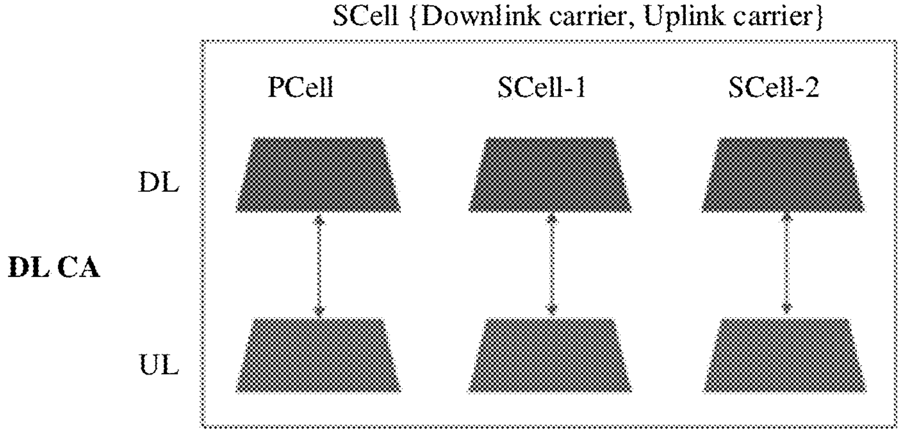
FIG. 2*a* is a schematic diagram of existing paired uplink and downlink carriers.

In a current carrier aggregation mechanism, one primary cell (PCell) and a plurality of secondary cells (SCell) are used. FIG. 2*a* is a schematic diagram of existing paired uplink and downlink carriers. In a downlink carrier aggregation (DL CA) scenario, a PCell, an SCell-1, and an SCell-2 are used, and an uplink carrier and a downlink carrier are usually paired. That is, a same quantity of downlink carriers need to correspond to a same quantity of uplink carriers. As a result, spectrum resources cannot be flexibly used in a carrier aggregation scenario. In addition, because uplink and downlink carriers are paired, the user equipment needs to have a capability of concurrent receiving and/or a capability of concurrent sending, to support the foregoing carrier aggregation. However, this significantly increases complexity of the user equipment.

Figure 2B:
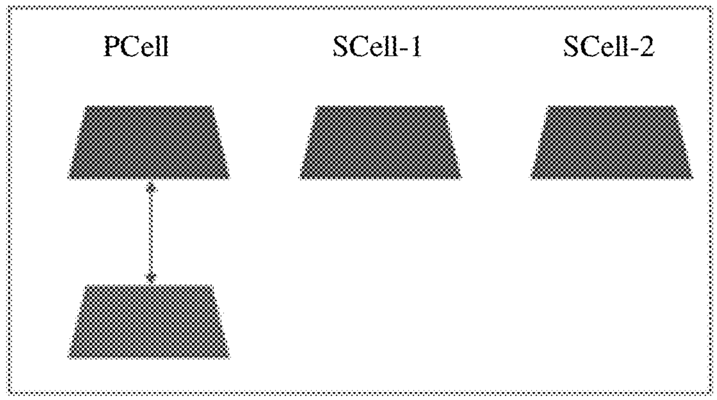
FIG. 2*b* is a schematic diagram of existing unpaired uplink and downlink carriers.

FIG. 2*b* is a schematic diagram of existing unpaired uplink and downlink carriers. In a downlink carrier aggregation (DL CA) scenario, a PCell, an SCell-1, and an SCell-2 are used, and an uplink carrier and a downlink carrier may not be paired. Usually, there is a case in which a quantity of downlink carriers exceeds a quantity of uplink carriers. For example, an uplink carrier and a downlink carrier of the PCell are paired, but only downlink carriers are configured for the SCell-1 and the SCell-2, and no uplink carrier is configured, that is, the SCell includes a downlink carrier but does not include (not applicable (NA)) an uplink carrier.

In a current carrier aggregation mechanism, spectrum usage is limited, and spectrum resources cannot be flexibly used. For example, an uplink carrier and a downlink carrier are usually paired. If user equipment supports carrier aggregation of a maximum of P1 downlink carriers, that is, each downlink carrier in the P1 downlink carriers has a corresponding uplink component carrier. That is, the P1 downlink carriers need to correspond to P1 uplink component carriers. In this way, spectrum resource utilization is greatly limited, and carrier aggregation can be used only when spectrum is paired. In another aspect, a maximum quantity of carriers for concurrent downlink reception of the user equipment is the same as a maximum quantity of carriers for concurrent uplink transmission of the user equipment. This increases complexity of the user equipment. In addition, if an uplink-dominant service is used, the UE needs more uplink carriers. However, in this case, the UE has to be associated with many downlink carriers. This increases channel state information (CSI) measurement of the associated downlink carriers.

Embodiments of this application provide an information transmission method, which is applicable to a communication scenario between a network device and a plurality of types of terminal devices, and may configure uplink carriers and/or downlink carriers for different types of terminal devices. In this embodiment of this application, the uplink carrier does not mean that only uplink transmission can be performed on the carrier. If downlink reception is also performed on a carrier, but a resource of the carrier is mainly used for uplink transmission, the carrier may also be referred to as an uplink carrier. Certainly, only uplink transmission can be performed on one carrier, and the carrier is also referred to as an uplink carrier. For example, in this embodiment of this application, all resources of at least one uplink carrier can be used only for uplink transmission, and/or some resources of the at least one uplink carrier can be used for downlink reception.

In this embodiment of this application, the downlink carrier does not mean that only downlink reception can be performed on the carrier. If uplink transmission is also performed on a carrier, but a resource of the carrier is mainly used for downlink reception, the carrier may also be referred to as a downlink carrier. Certainly, only downlink reception can be performed on one carrier, and the carrier is also a downlink carrier. For example, in this embodiment of this application, all resources of at least one downlink carrier can be used only for downlink reception, and/or some resources of the at least one downlink carrier can be used for uplink transmission.

In this embodiment of this application, the user equipment may determine at least one carrier for uplink transmission and/or at least one carrier for downlink reception based on a configuration of the network device and/or a preset rule (for example, one or more of a channel condition, a type/capability of the user equipment, a service type/requirement, a login (load) parameter, a synchronization raster, an antenna configuration, a radio frequency channel, a power amplifier, and an antenna port).

For example, the UE performs uplink transmission on a carrier included in a first set. The first set includes at least a first carrier and a second carrier, and the first carrier is on an uplink operating band of an Ni frequency band. The second carrier is on an uplink operating band of an Nj band, and (FUL, low) of the Nj band is not lower than (FUL, high) of the Ni band. Alternatively, a center frequency of the second carrier is higher than a center frequency of the first carrier. The second carrier is a carrier for all uplink transmission, or a ratio of an uplink slot to a downlink slot of the second carrier is X:Y, where X may be greater than or equal to Y, or the second carrier is a time division duplex multiplexing component carrier. The UE receives downlink information on a carrier included in a second set. The second set includes at least a third carrier. The third carrier is on a downlink operating band of the Ni band, and (FDL, low) of the Ni band is not lower than (FUL, high) of the Ni band. Alternatively, (FDL, low) of the Ni band is lower than (FUL, low) of the Nj band. Alternatively, a center frequency of the third carrier is higher than a center frequency of the first carrier, and the center frequency of the third carrier is lower than a center frequency of the second carrier. Ni or Nj is a frequency band number. (FUL, low) is a low frequency channel number of an uplink frequency corresponding to a frequency band, and (FUL, high) is a high frequency channel number of an uplink frequency corresponding to a frequency band.

The UE determines at least one carrier for uplink transmission and/or at least one carrier for downlink reception based on a configuration of the network device and/or a preset rule (for example, one or more of a channel condition, a type/capability of the UE, a service type/requirement, a login parameter, a synchronization raster, an antenna configuration, a radio frequency channel, a power amplifier, an antenna port, and the like). The UE performs uplink transmission on a carrier included in a first set. The first set includes at least a first carrier and a second carrier. The first carrier is on an uplink operating band of an Ni band. The second carrier is on an uplink operating band of an Nj band, and (FUL, low) of the Nj band may be not lower than (FUL, high) of the Ni band. Alternatively, a center frequency of the second carrier is higher than a center frequency of the first carrier. The second carrier is a carrier for all uplink transmission, or a ratio of an uplink slot to a downlink slot of the second carrier is X:Y, where X may be greater than or equal to Y, or the second carrier is a time division duplex multiplexing component carrier. The UE performs uplink transmission to a first node on the first carrier. The UE performs uplink transmission to a second node on the second carrier. The first node and the second node are different communication nodes.

For example, in this embodiment of this application, all frequency resources of each of the one or more uplink carriers can be used only for uplink transmission. For another example, in this embodiment of this application, some resources on at least one uplink carrier may be used for downlink reception. For another example, in this embodiment of this application, all frequency resources on a part of uplink carriers can be used only for uplink transmission, and a part of resources on the uplink carriers can be used for downlink reception.

Figure 3:
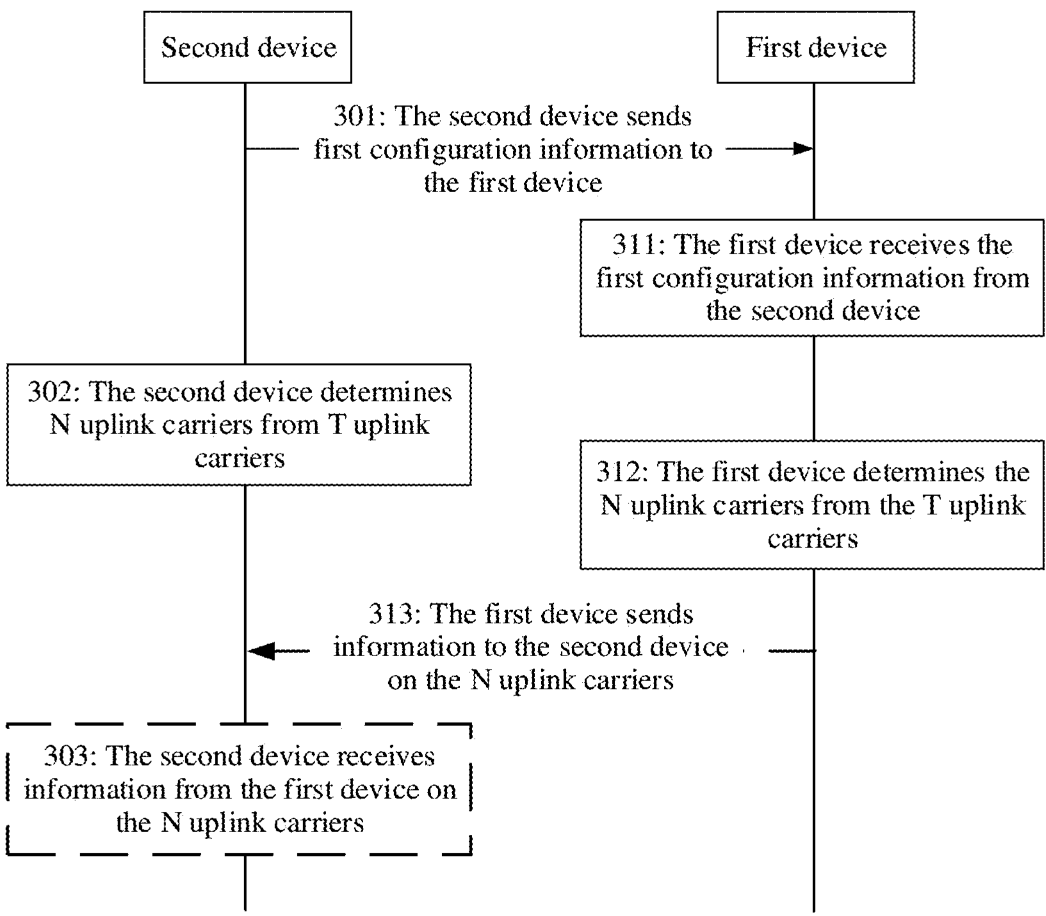
FIG. 3 is a schematic block diagram of an interaction procedure between a first device and a second device according to an embodiment of this application.

FIG. 3 is a schematic flowchart of interaction between a first device and a second device according to an embodiment of this application. In the interaction procedure, step 301 to step 303 are described from a side of the second device, and step 311 to step 313 are described from a side of the first device. The interaction procedure shown in FIG. 3 mainly includes the following steps.

301: The second device sends first configuration information to the first device. The first configuration information instructs the second device to configure T uplink carriers for the first device. At least one element in a value set of T is a positive integer greater than L, and L is a maximum quantity of uplink carriers on which the first device can simultaneously perform uplink transmission.

For example, all uplink carriers in the T uplink carriers configured by the second device for the first device may be used for uplink carrier selection (or uplink carrier switching, or uplink transmit channel adjustment, or uplink transmit antenna switching or adjustment, or uplink carrier measurement). For another example, only a part of the T uplink carriers configured by the second device for the first device may be used for uplink carrier selection (or uplink carrier switching, or uplink transmit channel adjustment, or uplink transmit antenna switching or adjustment, or uplink carrier measurement). For example, in the T uplink carriers configured by the second device for the first device, one or more uplink carriers other than those used for uplink carrier selection (or uplink carrier switching, or uplink transmit channel adjustment, or uplink transmit antenna switching or adjustment, or uplink carrier measurement) may be used for radio resource management measurement or may be used for other measurement. That is, one or more carriers that are in the T uplink carriers configured by the second device for the first device and that are not used for uplink carrier selection (or uplink carrier switching, or uplink transmit channel adjustment, or uplink transmit antenna switching or adjustment) may be used for radio resource management measurement, or may be used for other measurement.

In this embodiment of this application, the first device may be a terminal device, and the second device may be a network device. Alternatively, the first device may be a terminal device, and the second device may be a peer device of the terminal device. The second device may configure an uplink carrier for the first device, and the second device may configure a plurality of uplink carriers for the first device. For example, a quantity of uplink carriers configured by the second device for the first device is represented by T. If the maximum quantity of uplink carriers on which the first device can simultaneously perform uplink transmission is represented by L, the value set of T may include one or more elements, and at least one element in the value set of T is greater than L. For example, T may be greater than L, or T may be less than or equal to L. Specifically, the maximum quantity of uplink carriers on which the first device can simultaneously perform uplink transmission is a maximum uplink concurrency capability of the first device, and a value of L indicates a value of the uplink concurrency capability of the first device. For example, a minimum value of L is 2. T represents an actual quantity of uplink carriers configured by the second device for the first device, and the at least one element in the value set of T may be greater than L. That is, the second device may configure, for the first device, a quantity of uplink carriers that exceeds the maximum quantity of uplink carriers on which the first device can simultaneously perform transmission. In other words, the actual quantity of uplink carriers configured by the second device for the first device exceeds the maximum uplink concurrency capability of the first device. For example, if a value of L is 3, the maximum uplink concurrency capability of the first device is three uplink carriers, a value of T may be greater than a value of L. For example, if a value of T is 5, the actual quantity of uplink carriers configured by the second device for the first device is 5, and 5 is greater than 3. It indicates that the actual quantity of uplink carriers configured by the second device for the first device exceeds the maximum uplink concurrency capability of the first device. There is no limitation that a value of T may be less than or equal to a value of L. For example, if a value of T is 3, and a value of L is 3, it indicates that the actual quantity of uplink carriers configured by the second device for the first device is equal to the maximum uplink concurrency capability of the first device.

It should be noted that, in this embodiment of this application, at least one element in the value set of T indicated by the first configuration information may be greater than L. This means that the first configuration information has a function that the actual quantity of uplink carriers configured for the first device can exceed a maximum quantity of concurrent uplink carriers of the first device. Certainly, there is no limitation that the actual quantity of uplink carriers configured by the second device for the first device may exceed the maximum uplink concurrency capability of the first device, or the actual quantity of uplink carriers configured by the second device for the first device may not exceed the maximum uplink concurrency capability of the first device, or the actual quantity of uplink carriers configured by the second device for the first device always exceeds or is not less than the maximum uplink concurrency capability of the first device. In this embodiment of this application, the second device has a function that the actual quantity of uplink carriers configured for the first device exceeds the maximum uplink concurrency capability of the first device, but this does not necessarily mean that "the second device has the actual quantity of uplink carriers configured for the first device exceeding the maximum uplink concurrency capability of the first device". Specifically, the actual quantity of uplink carriers configured by the second device for the first device needs to be determined based on an application scenario. Similarly, the at least one element in the value set of T indicated by the first configuration information may be greater than L, but this does not necessarily mean that "T indicated by the first configuration information needs to be greater than L". T indicated by the first configuration information may alternatively be less than or equal to L. This is not limited herein.

In some embodiments of this application, the second device may configure at least T uplink carriers for the first device. To be specific, the second device may configure T uplink carriers for the first device, or the second device may configure T+1 uplink carriers for the first device, or the second device may configure T+2 uplink carriers for the first device. In this embodiment of this application, the actual quantity of uplink carriers configured by the second device for the first device is not limited. In particular, T=3, or T=L.

In some embodiments of this application, in addition to step 301 performed by the second device, the information transmission method provided in this embodiment of this application further includes:

The second device receives first capability information from the first device; and the second device determines, based on the first capability information, that the first device can determine, from uplink carriers whose quantity is greater than L, an uplink carrier used for sending information; and/or the second device determines, based on the first capability information, that the first device can support determining, from a maximum of S uplink carriers, an uplink carrier used for sending information, and at least one element in a value set of S is a positive integer greater than L; and/or the second device determines L based on the first capability information; and/or the second device determines, based on the first capability information, that the first device can support determining, from a maximum of A enabled uplink carriers, an uplink carrier used for sending information. For example, A is a positive integer greater than L.

The first device generates the first capability information, and sends the first capability information to the second device. The first capability information indicates an uplink carrier support capability of the first device, so that the second device determines the uplink carrier support capability of the first device based on the received first capability information. The second device may configure the actual quantity of uplink carriers for the first device based on the uplink carrier support capability of the first device.

Specifically, the first capability information may indicate capabilities of a plurality of uplink carriers of the first device. For example, the first capability information indicates that the first device can determine, from uplink carriers whose quantity is greater than L, an uplink carrier used for sending information. It should be noted that the determined uplink carrier used for sending information is a potential or candidate uplink carrier that can be used for uplink transmission, or a (candidate) carrier used for carrier selection (or channel switching), or an enabled uplink carrier. That is, it is determined that the uplink carrier used for sending information is not an uplink carrier on which the first device can actually perform uplink transmission. The first device may determine, from candidate uplink carriers, an uplink carrier on which uplink transmission can be actually performed (for example, in concurrent). That is, determining the uplink carrier used for sending information is determining an uplink carrier that may be used for actual uplink transmission. A quantity of candidate uplink carriers may exceed a quantity of uplink carriers on which the first device can actually perform concurrent uplink transmission. Alternatively, a quantity of candidate uplink carriers may exceed a maximum quantity of uplink carriers on which the first device can actually perform concurrent uplink transmission.

The first capability information reflects a capability of the first device to determine, from the uplink carriers whose quantity is greater than L, the uplink carrier used for sending information. To be specific, the second device may determine, based on the first capability information, that the first device can determine, from the uplink carriers whose quantity is greater than L, the uplink carrier used for sending information. The reflection means that the first capability information may be used for direct indication, or the first capability information may be used for indirect indication, explicit indication, implicit indication, or the like. In addition, the first capability information indicates that the first device can determine, from the uplink carriers whose quantity is greater than L, the uplink carrier used for sending information. The indication herein may be a direct indication, an indirect indication, an explicit indication, an implicit indication, or the like. The first capability information reflects that "the first device can determine, from the uplink carriers whose quantity is greater than L, the uplink carrier used for sending information", and "the first device can determine, from the uplink carriers whose quantity is greater than L, the uplink carrier used for sending information" is a result reflected by the first capability information. The first capability information may directly indicate the result, or may indirectly indicate the result. This is not limited herein. For descriptions of "reflection" in subsequent embodiments, refer to this embodiment. "Reflection" is not described in detail subsequently.

Specifically, the first capability information indicates that the first device can support determining, from the maximum of S uplink carriers, the uplink carrier used for sending information. The first capability information reflects that the first device has a capability of supporting determining, from the maximum of S uplink carriers, the uplink carrier used for sending information. That is, the second device may determine, based on the first capability information, that the first device can support determining, from the maximum of S uplink carriers, the uplink carrier used for sending information. The at least one element in the value set of S is a positive integer greater than L.

Specifically, the first capability information indicates L, that is, the first capability information may directly indicate "the maximum quantity of uplink carriers on which the first device can simultaneously perform uplink transmission", and "the maximum quantity of uplink carriers on which the first device can simultaneously perform uplink transmission" is equal to L. In addition, the first capability information indicating L may also be expressed as the first capability information reflecting L. For descriptions of the indication and the reflection, refer to the foregoing content.

For example, a maximum quantity of uplink component carriers on which user equipment can simultaneously perform uplink transmission is L, and the user equipment sends first capability information to a peer device. The first capability information indicates the maximum quantity L of uplink carriers on which the user equipment can simultaneously transmit information; and the user equipment supports that a quantity of uplink carriers configured by the peer device for the user equipment can be greater than L. In this embodiment of this application, the peer device determines, based on the received first capability information, an uplink carrier support capability of the user equipment, and the peer device may configure an actual quantity of uplink carriers for the user equipment based on the uplink carrier support capability of the user equipment.

Specifically, the first capability information indicates that the first device can support determining, from a maximum of A enabled uplink carriers, an uplink carrier used for sending information. For example, A is a positive integer greater than L. Enabling means that the second device activates an uplink carrier, or the second device configures an uplink carrier to enable the carrier to be used by the first device. For another example, enabling a carrier means indicating that a radio frequency channel of the terminal device is ready to use the carrier. Therefore, switching between enabled carriers takes less time. Based on the first capability information, the second device may determine that the first device can support the maximum of A enabled uplink carriers, and the second device may determine, from the maximum of A enabled uplink carriers, an uplink carrier available to the first device.

In some embodiments of this application, the second device can configure a maximum of M uplink carriers for the first device, and M is a positive integer greater than L.

The second device can configure the maximum of M uplink carriers for the first device. That is, the second device has a capability of configuring the maximum quantity of M uplink carriers for the first device, and M is greater than L. For example, a value of L is 2, and a value of M may be 5. Optionally, the first configuration information may indicate the second device to configure the maximum of M uplink carriers for the first device. In other words, the first configuration information can be used for configuring the maximum of M uplink carriers for user equipment. The maximum quantity of uplink carriers on which the first device can simultaneously perform uplink transmission is L. M is a positive integer greater than 1, and L is a positive integer less than M.

In some embodiments of this application, in addition to step 301 performed by the second device, the information transmission method provided in this embodiment of this application further includes:

The second device sends third configuration information to the first device. The third configuration information indicates an uplink carrier enabled by the second device for the first device and/or a quantity of uplink carriers enabled by the second device for the first device. The quantity of uplink carriers enabled by the second device for the first device can be greater than L.

The enabling in this embodiment of this application may be activation, configuration, or indication.

In addition to sending the first configuration information to the first device, the second device may further send the third configuration information to the first device. The first configuration information and the third configuration information may be sent to the first device simultaneously. For example, the second device includes the first configuration information and the third configuration information by using a same piece of signaling or a same information element or field. Alternatively, the first configuration information and the third configuration information may be separately sent to the first device by using different pieces of signaling or different information elements or different fields. This is not limited herein.

In this embodiment of this application, the third configuration information indicates the uplink carrier enabled by the second device for the first device and/or the quantity of uplink carriers enabled by the second device for the first device. For example, the third configuration information may directly indicate an uplink carrier enabled by the second device for the first device and/or a quantity of uplink carriers enabled by the second device for the first device, and the first device determines, based on the third configuration information, the quantity of uplink carriers enabled by the second device for the first device. For another example, the third configuration information may directly indicate disabled uplink carriers and/or a quantity of disabled uplink carriers. The first device determines the quantity of disabled uplink carriers based on the third configuration information, and then determines a quantity of enabled uplink carriers based on a total quantity of uplink carriers and the quantity of disabled uplink carriers. The quantity of uplink carriers enabled by the second device for the first device can be greater than L, and a specific value of the quantity of uplink carriers enabled by the second device for the first device is not limited.

311: The first device receives the first configuration information from the second device. The first configuration information instructs the second device to configure the T uplink carriers for the first device. The at least one element in the value set of T is a positive integer greater than L. L is the maximum quantity of uplink carriers on which the first device can simultaneously perform uplink transmission.

In this embodiment of this application, the first device may receive the first configuration information, and the first device determines, based on the first configuration information, that the second device configures the T uplink carriers for the first device. For descriptions of the first configuration information and the value of T, refer to the descriptions in step 301. Details are not described herein again.

In some embodiments of this application, in addition to step 311 performed by the first device, the information transmission method provided in this embodiment of this application further includes:

the first device reports first capability information to the second device, where the first capability information indicates that the first device can determine, from uplink carriers whose quantity is greater than L, an uplink carrier used for sending information; and/or the first capability information indicates that the first device can support determining, from a maximum of S uplink carriers, an uplink carrier used for sending information, and S is a positive integer greater than L; and/or the first capability information indicates L; and/or the first capability information indicates that the first device can support determining, from a maximum of A enabled uplink carriers, an uplink carrier used for sending information. A is a positive integer greater than L.

The first device generates the first capability information, and sends the first capability information to the second device. The first capability information indicates an uplink carrier support capability of the first device, so that the second device determines the uplink carrier support capability of the first device based on the received first capability information. The second device may configure an actual quantity of uplink carriers for the first device based on the uplink carrier support capability of the first device.

Specifically, the first capability information may indicate capabilities of a plurality of uplink carriers of the first device. For example, the first capability information indicates that the first device can determine, from the uplink carriers whose quantity is greater than L, the uplink carrier used for sending information. The first capability information reflects that the first device has a capability of determining, from the uplink carriers whose quantity is greater than L, the uplink carrier used for sending information. To be specific, the second device may determine, based on the first capability information, that the first device can determine, from the uplink carriers whose quantity is greater than L, the uplink carrier used for sending information. The reflection means that the first capability information may be used for direct indication, or the first capability information may be used for indirect indication, explicit indication, implicit indication, or the like. In addition, the first capability information indicates that the first device can determine, from the uplink carriers whose quantity is greater than L, the uplink carrier used for sending information. The indication herein may be a direct indication, an indirect indication, an explicit indication, an implicit indication, or the like. The first capability information reflects that "the first device can determine, from the uplink carriers whose quantity is greater than L, the uplink carrier used for sending information", and "the first device can determine, from the uplink carriers whose quantity is greater than L, the uplink carrier used for sending information" is a result reflected by the first capability information. The first capability information may directly indicate the result, or may indirectly indicate the result. This is not limited herein. For descriptions of "reflection" in subsequent embodiments, refer to this embodiment. "Reflection" is not described in detail subsequently.

In this embodiment of this application, determining the uplink carrier used for sending information means that the first device determines a potential or candidate uplink carrier that can be used for uplink transmission, and is not an uplink carrier on which the first device can actually perform concurrent uplink transmission. The first device may determine, from candidate uplink carriers, an uplink carrier on which concurrent uplink transmission can be actually performed. That is, determining the uplink carrier used for sending information is determining an uplink carrier that may be used for actual uplink transmission. Alternatively, a quantity of candidate uplink carriers may exceed a maximum quantity of uplink carriers on which the first device can actually perform concurrent uplink transmission.

Specifically, the first capability information indicates that the first device can support determining, from the maximum of S uplink carriers, the uplink carrier used for sending information. The first capability information reflects that the first device has a capability of supporting determining, from the maximum of S uplink carriers, the uplink carrier used for sending information. To be specific, the second device may determine, based on the first capability information, that the first device can support determining, from the maximum of S uplink carriers, the uplink carrier used for sending information, and the at least one element in the value set of S is a positive integer greater than L.

Specifically, the first capability information indicates L, that is, the first capability information may directly indicate "the maximum quantity of uplink carriers on which the first device can simultaneously perform uplink transmission", and "the maximum quantity of uplink carriers on which the first device can simultaneously perform uplink transmission" is equal to L. In addition, the first capability information indicating L may also be expressed as "the first capability information reflects L". For an example of indication and reflection, the foregoing content is described in detail. Details are not described herein again.

Specifically, the first capability information indicates that the first device can support determining, from a maximum of A enabled uplink carriers, an uplink carrier used for sending information. For example, A is a positive integer greater than L. Enabling means that the second device activates an uplink carrier, or the second device configures an uplink carrier to enable the carrier to be used by the first device. Based on the first capability information, the second device may determine that the first device can support the maximum of A enabled uplink carriers, and the second device may determine, from the maximum of A enabled uplink carriers, an uplink carrier available to the first device.

In some embodiments of this application, the first capability information is used for enabling the second device to determine that the first device supports that a quantity of uplink carriers configured by the second device for the first device can be greater than L; and/or the first capability information is used for enabling the second device to determine that the first device can support a maximum quantity S of uplink carriers configured by the second device for the first device; and/or the first capability information is used for enabling the second device to determine that a maximum quantity of uplink carriers on which the first device can simultaneously perform uplink transmission is L;

and/or the first capability information is used for enabling the second device to determine that the first device can support determining, from a maximum of A enabled uplink carriers, an uplink carrier used for sending information, and A is greater than L.

Specifically, the first capability information indicates that the first device can determine, from the uplink carriers whose quantity is greater than L, the uplink carrier used for sending information. In this way, the second device determines, based on the received first capability information, that the quantity of uplink carriers that the first device supports the second device to configure for the first device can be greater than L, and the second device may configure an actual quantity of uplink carriers for the first device based on the uplink carrier support capability of the first device.

Specifically, the first capability information indicates that the first device can support determining, from the maximum of S uplink carriers, the uplink carrier used for sending information. In this way, the second device determines, based on the received first capability information, that the maximum quantity of uplink carriers that the first device can support the second device to configure for the first device is S, and the second device may configure an actual quantity of uplink carriers for the first device based on the uplink carrier support capability of the first device.

Specifically, the first capability information indicates L, so that the second device determines, based on the received first capability information, that the maximum quantity of uplink carriers on which the first device can simultaneously perform uplink transmission is L, and the second device may configure an actual quantity of uplink carriers for the first device based on the uplink carrier support capability of the first device.

For example, the first device is user equipment, and the second device is a peer device of the user equipment. For example, the peer device may be a base station, or the peer device is a machine type communication terminal, or the peer device is a communication terminal used for an internet of vehicles service. For example, L is a positive integer greater than 1. For example, L=2.

302: The second device determines N uplink carriers from the T uplink carriers. N is a positive integer less than or equal to L.

The N uplink carriers are used for receiving information from the first device. For example, the first device may transmit uplink information with the second device on the N uplink carriers, and the N uplink carriers are used by the second device to receive information from the first device. For another example, the first device may transmit uplink information with a third device on the N uplink carriers, and the N uplink carriers are used by the third device to receive information from the first device. For another example, the first device may transmit uplink information with the second device and the third device on the N uplink carriers, and the N uplink carriers are used by the second device and the third device to receive information from the first device. Specifically, the second device may be a macro base station, and the third device may be a micro base station. In a subsequent embodiment, an example in which the first device sends information to the second device on the N uplink carriers is used. In this case, the second device may further perform subsequent step 303.

For example, the first device sends an uplink signal on an uplink carrier, so that the second device performs measurement on a part or all of the T uplink carriers, and the second device determines the N uplink carriers from the T uplink carriers. The second device may configure an uplink carrier set for the first device for uplink carrier selection (or uplink carrier switching, or uplink transmit channel adjustment, or uplink transmit antenna switching or adjustment). The uplink carrier set may include a part of the T uplink carriers. For example, switching between two different carriers in the uplink carrier set takes less time. However, switching between at least two other different carriers in the T uplink carriers other than the carrier included in the uplink carrier set takes more time.

In this embodiment of this application, after the second device configures the T uplink carriers for the first device, the second device may further determine an uplink carrier that can be actually used by the first device. For example, the second device selects a carrier, and determines an uplink carrier that can be actually used by the first device. Alternatively, the second device notifies the first device of an uplink carrier that can be actually used by the first device. For another example, the second device receives a notification of the first device or information sent by the first device, and determines, based on the notification or the sent information, the uplink carrier that can be actually used by the first device. The second device configures the T uplink carriers for the first device, and the first device determines the N uplink carriers from the T uplink carriers. The N uplink carriers are uplink carriers that can be actually used by the first device. Because N is a quantity of carriers selected from the T uplink carriers, N is less than or equal to T. The maximum quantity of uplink carriers on which the first device can simultaneously perform uplink transmission is represented by L. Therefore, N is less than or equal to L. For example, if a value of L is 3, a value of N may be less than or equal to 3. A value of N is not limited in this embodiment of this application.

In some embodiments of this application, the first device determining N uplink carriers from T uplink carriers includes: determining, from uplink carriers configured by the second device for the first device, the N uplink carriers on which uplink transmission can be simultaneously performed. N is a positive integer less than or equal to L. The N uplink carriers are an actual quantity of uplink carriers that can be used by the first device for simultaneous uplink transmission. N is the N uplink carriers determined by the first device from the uplink carriers configured by the second device for the first device. A value of N does not exceed an actual quantity of uplink carriers configured by the second device for the first device, and does not exceed an uplink concurrency capability of the first device. It should be noted that step 302 may be an optional step in the method implemented by the second device.

312: The first device determines the N uplink carriers from the T uplink carriers. N is a positive integer less than or equal to L.

The first device performs uplink carrier selection (or uplink carrier switching, or uplink transmit channel adjustment, or uplink transmit antenna switching or adjustment) based on downlink measurement. Alternatively, the first device sends an uplink signal on an uplink carrier, so that the second device performs measurement on a part or all of the T uplink carriers. In this way, the first device performs uplink carrier selection (or uplink carrier switching, or uplink transmit channel adjustment, or uplink transmit antenna switching or adjustment) based on an indication of the second device. Alternatively, the first device sends an uplink signal on an uplink carrier, so that the third device performs measurement on a part or all of the T uplink carriers, the second device indicates the first device based on measurement information reported by the third device, and the first device performs uplink carrier selection (or uplink carrier switching, or uplink transmit channel adjustment, or uplink transmit antenna switching or adjustment). For example, the third device is a micro cell such as a Pico, and the second device is a Macro, that is, a macro base station. For another example, the first device receives a notification from the second device, and determines the N uplink carriers based on the notification.

In this embodiment of this application, after the first device determines, based on the first configuration information, that the second device configures the T uplink carriers for the first device, the first device may further determine an uplink carrier that can be actually used by the first device. For example, the first device selects a carrier, and determines an uplink carrier that can be actually used by the first device. Optionally, the first device notifies the second device of an uplink carrier that can be actually used by the first device. For another example, the first device receives a notification from the second device, and determines, based on the notification, an uplink carrier that can be actually used by the first device. The second device configures the T uplink carriers for the first device. The first device determines the N uplink carriers from the T uplink carriers. The N uplink carriers are uplink carriers actually used by the first device. A value of N may be equal to 1, or a value of N is greater than 1. For example, a value of N is 2. Because N is a quantity of carriers selected from the T uplink carriers, N is less than T, and the maximum quantity of uplink carriers on which the first device can simultaneously perform uplink transmission is represented by L, N is less than or equal to L. For example, if a value of L is 3, a value of N may be less than or equal to 3. A value of N is not limited in this embodiment of this application.

For example, the second device configures T uplink carriers for the first device, and T=5. L is a maximum quantity of uplink carriers on which the first device can simultaneously perform uplink transmission, and L=3. The first device determines N uplink carriers from the T uplink carriers, and N=2. Therefore, the first device may determine two uplink carriers from five uplink carriers. The two uplink carriers are uplink carriers used by the first device for uplink transmission. In this embodiment of this application, the first terminal device has a capability of flexibly selecting a carrier from more carriers beyond an uplink concurrency capability of the first terminal device. Therefore, the first device can flexibly use spectrum resources.

In some embodiments of this application, step 312 in which the first device determines the N uplink carriers from the T uplink carriers may further include:

The first device receives the third configuration information from the second device. The third configuration information indicates the uplink carrier enabled by the second device for the first device and/or the quantity of uplink carriers enabled by the second device for the first device. The quantity of uplink carriers enabled by the second device for the first device can be greater than L.

Optionally, the first device determines the N uplink carriers from the uplink carriers enabled by the second device for the first device.

For example, in the T uplink carriers configured by the second device for the first device, switching (or uplink carrier selection, or uplink transmit channel adjustment, or uplink transmit antenna switching or adjustment) between some carriers takes less time, and switching (or uplink carrier selection, or uplink transmit channel adjustment, or uplink transmit antenna switching or adjustment) between some carriers takes more time. The second device configures or indicates, from the T uplink carriers, enabled uplink carriers for the first device, and a time required by the first device to perform carrier switching (or uplink carrier selection, or uplink transmit channel adjustment, or uplink transmit antenna switching or adjustment) on these enabled uplink carriers is short. The first device does not perform uplink carrier switching (or uplink carrier selection, or uplink transmit channel adjustment, or uplink transmit antenna switching or adjustment) on a disabled uplink carrier of the T uplink carriers, or the first device performs carrier switching (or uplink carrier selection, or uplink transmit channel adjustment, or uplink transmit antenna switching or adjustment) on a disabled uplink carrier of the T uplink carriers takes more time, or the first device (or the second device) performs radio resource management measurement on at least one disabled uplink carrier of the T uplink carriers.

The second device may configure an enabled uplink carrier for the first device. For example, the first device sends an uplink signal on an uplink carrier, so that the second device performs measurement on a part or all of the T uplink carriers, and the second device determines the N uplink carriers from the T uplink carriers. The second device may configure an uplink carrier set for the first device for uplink carrier selection (or uplink carrier switching, or uplink transmit channel adjustment, or uplink transmit antenna switching or adjustment). The uplink carrier set may include a part of the T uplink carriers. For example, switching between two different carriers in the uplink carrier set takes less time. However, switching between at least two other different carriers in the T uplink carriers other than the carrier included in the uplink carrier set takes more time.

In addition to receiving the first configuration information sent by the second device, the first device may further receive the third configuration information sent by the second device, and the first device may simultaneously receive the first configuration information and the third configuration information. For example, the second device includes the first configuration information and the third configuration information by using one piece of signaling or an information element or a field. The first device receives the first configuration information and the third configuration information by using a same piece of signaling or a same information element or field. Alternatively, the first device may separately receive the first configuration information and the third configuration information. This is not limited herein.

In this embodiment of this application, the third configuration information indicates the uplink carrier enabled by the second device for the first device and/or the quantity of uplink carriers enabled by the second device for the first device. For example, the third configuration information may directly indicate an uplink carrier enabled by the second device for the first device. The first device determines, based on the third configuration information, the uplink carrier enabled by the second device for the first device. For another example, the third configuration information may directly indicate a disabled uplink carrier. The first device determines disabled uplink carriers based on the third configuration information, and then determines enabled uplink carriers based on total uplink carriers and the disabled uplink carriers. A quantity of uplink carriers enabled by the second device for the first device can be greater than L. A specific value of the quantity of uplink carriers enabled by the second device for the first device is not limited.

After determining the uplink carrier enabled by the second device for the first device, the first device may determine the N uplink carriers from the uplink carrier enabled by the second device for the first device. The N uplink carriers are uplink carriers actually used or sent in concurrent by the first device. The N uplink carriers may be a part or all of the uplink carriers enabled by the second device for the first device. This is not limited herein.

The first device determining the N uplink carriers may be the first device determining the N uplink carriers by itself based on measurement. Alternatively, the first device may determine the N uplink carriers based on received one or more pieces of indication information (or configuration information, or downlink control information) sent by the second device to the first device.

For example, the second device configures T uplink carriers for the first device, and T=5. L is a maximum quantity of uplink carriers on which the first device can simultaneously perform uplink transmission, and L=3. The third configuration information indicates that the second device enables four uplink carriers for the first device. In this case, the first device determines N uplink carriers from the four enabled uplink carriers, and N=2. Therefore, the first device may determine two uplink carriers from the four enabled uplink carriers. The two uplink carriers are uplink carriers used by the first device for uplink transmission. In this embodiment of this application, the first terminal device has a capability of flexibly selecting a carrier from more carriers beyond an uplink concurrency capability of the first terminal device. Therefore, the first device can flexibly use spectrum resources.

313: The first device sends information on the N uplink carriers.

In this embodiment of this application, for example, the first device determines that the N uplink carriers are uplink carriers used by the first device for uplink transmission. The first device may perform uplink information transmission with the second device on the N uplink carriers, or the first device may perform uplink information transmission with the third device on the N uplink carriers, or the first device may perform uplink information transmission with the second device and the third device on the N uplink carriers. For example, the second device may be a macro base station, and the third device may be a micro base station. For example, the first device sends information to the second device on the N uplink carriers. The first device sends information to the second device on the N uplink carriers, so that the first device can communicate with the second device. For example, if a value of N is 1, the first device may send information to the second device on one uplink carrier. For another example, if a value of N is greater than 1, the first device may simultaneously send information to the second device on the N uplink carriers. Alternatively, the first device may send information to the second device on the N uplink carriers in a time-division manner.

Optionally, 303: The second device receives information from the first device on the N uplink carriers.

In this embodiment of this application, the second device determines the N uplink carriers, and the N uplink carriers are uplink carriers used by the first device for simultaneous uplink transmission. The second device may perform uplink information transmission with the first device on the N uplink carriers. For example, the second device receives information from the first device on the N uplink carriers, so that the second device can communicate with the first device.

It can be learned by using an example described in the foregoing embodiment that the first device first receives the first configuration information from the second device. The second device may indicate, by using the first configuration information, to configure the T uplink carriers for the first device, and the at least one element in the value set of T is a positive integer greater than L. For example, a value of T may be greater than a value of L. L is a maximum quantity of uplink carriers on which the first device can simultaneously perform uplink transmission, and L may indicate a maximum quantity of uplink carriers that can be used by the first device for simultaneous uplink transmission. That is, the first device can use a maximum of L uplink carriers during concurrent uplink transmission. After the first device determines that the second device configures the T uplink carriers for the first device, the first device may determine the N uplink carriers from the T uplink carriers. That is, the first device may select carriers from the T uplink carriers, and T may be greater than L. Therefore, the first device may select carriers from carriers whose quantity exceeds the maximum quantity of uplink carriers for simultaneous transmission of the first device. Finally, the first device sends information to the second device on the N uplink carriers, and a value of N is less than or equal to a value of L. This implements information transmission between the first device and the second device. In this embodiment of this application, the first device has a capability of flexibly selecting a carrier from more carriers beyond an uplink concurrency capability of the first device, so that the second device can configure more uplink carriers for the first device, and the first device flexibly selects a carrier from more carriers. Therefore, the first device can flexibly use spectrum resources, effectively perform uplink transmission by using appropriate resources, improve an uplink rate and coverage, and reduce power consumption of the first terminal device.

The foregoing step 301 to step 303 and step 311 to step 313 describe an uplink carrier configuration and an uplink information transmission process. The following describes a downlink carrier configuration and a downlink information transmission process. Terms and examples that are the same in the configuration manner of the downlink carrier and the configuration manner of the uplink carrier are not described in detail again. For details, refer to the descriptions in the foregoing embodiments.

Figures 4, 5:
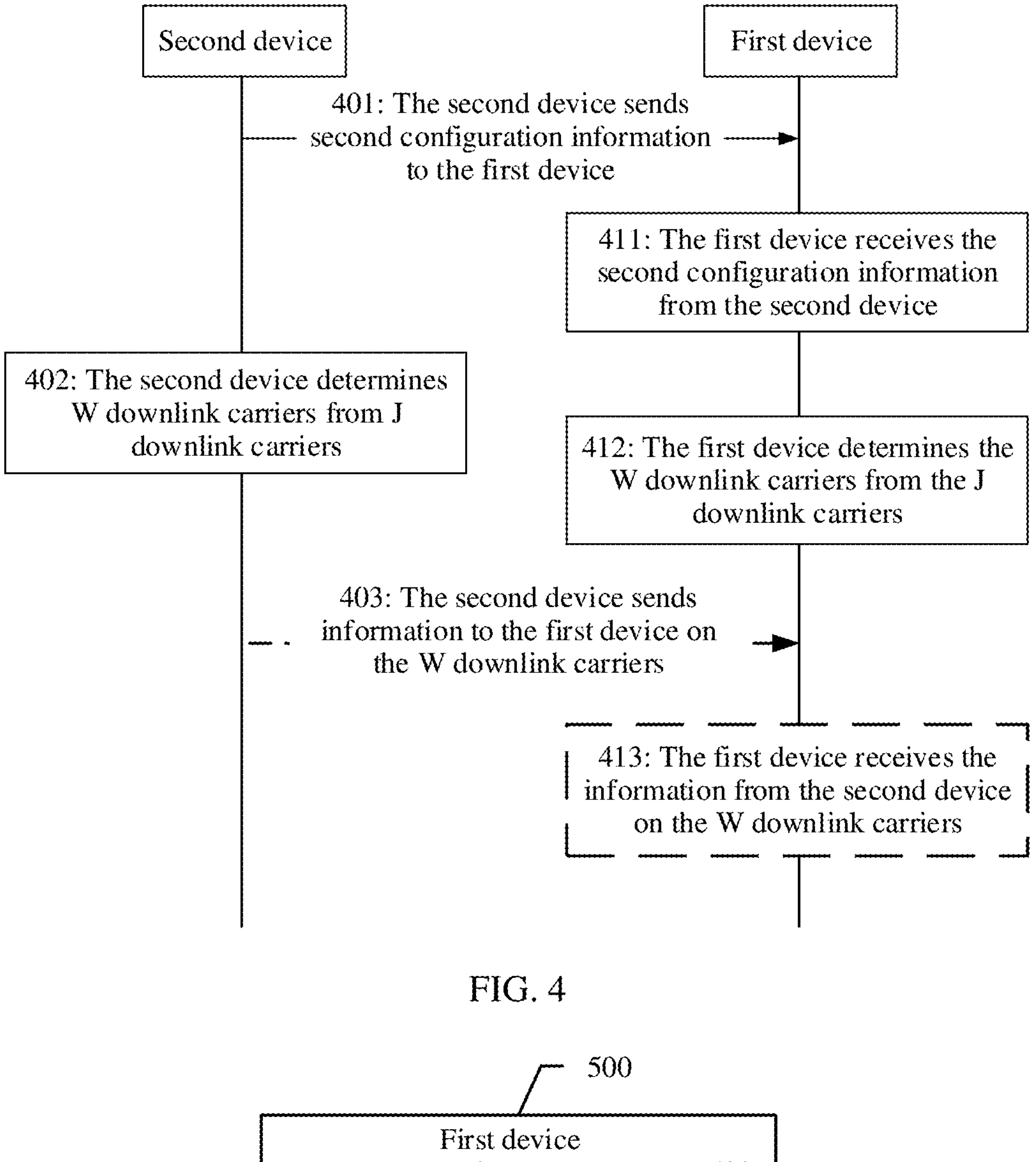
FIG. 4 is a schematic block diagram of an interaction procedure between a first device and a second device according to an embodiment of this application.
FIG. 5 is a schematic diagram of a composition structure of a first device according to an embodiment of this application.

In this embodiment of this application, the foregoing content describes an uplink transmission process. The following describes a downlink receiving process by using an example. For a meaning of downlink receiving, refer to the foregoing content. As shown in FIG. 4, an interaction procedure between a second device and a first device includes the following steps.

401: The second device sends second configuration information to the first device. The second configuration information instructs the second device to configure J downlink carriers for the first device, and at least one element in a value set of J is a positive integer greater than K. K is a maximum quantity of downlink carriers on which the first device can simultaneously perform downlink reception.

411: The first device receives the second configuration information from the second device. The second configuration information instructs the second device to configure the J downlink carriers for the first device, and the at least one element in the value set of J is a positive integer greater than K. K is the maximum quantity of downlink carriers on which the first device can simultaneously perform downlink reception.

The second device may configure a downlink carrier for the first device, and the second device may configure a plurality of downlink carriers for the first device. For example, a quantity of downlink carriers configured by the second device for the first device may be represented by J. If a maximum quantity of downlink carriers on which the first device can simultaneously perform downlink reception is represented by K, at least one element in a value set of J is greater than K. For example, J may be greater than K, or J may be less than or equal to K. For example, an actual quantity of downlink carriers configured by the second device for the first device always exceeds or is not less than a maximum downlink receiving capability of the first device. Specifically, the maximum quantity of downlink carriers on which the first device can simultaneously perform downlink reception is a maximum downlink receiving capability of the first device. A value of K indicates a downlink receiving capability of the first device. J represents an actual quantity of downlink carriers configured by the second device for the first device, and J may be greater than K. That is, the second device may configure, for the first device, a quantity of downlink carriers that exceeds the maximum quantity of downlink carriers on which the first device can simultaneously perform reception. That is, the actual quantity of downlink carriers configured by the second device for the first device exceeds a maximum downlink concurrency capability of the first device. For example, if a value of K is 3, the maximum downlink concurrency capability of the first device is three downlink carriers, and a value of J may be greater than a value of K. For example, if a value of J is 5, the actual quantity of downlink carriers configured by the second device for the first device is 5, and 5 is greater than 3. It indicates that the actual quantity of downlink carriers configured by the second device for the first device exceeds the maximum downlink concurrency capability of the first device. There is no limitation that a value of J may alternatively be less than or equal to a value of K. For example, if a value of J is 3, and a value of K is 3, it indicates that the actual quantity of downlink carriers configured by the second device for the first device is equal to the maximum downlink concurrency capability of the first device.

It should be noted that, in this embodiment of this application, J indicated by the second configuration information may be greater than K. This means that the second configuration information has a capability that the actual quantity of downlink carriers configured for the first device exceeds the maximum downlink receiving capability of the first device. Certainly, the actual quantity of downlink carriers configured by the second device for the first device may exceed the maximum downlink receiving capability of the first device, or the actual quantity of downlink carriers configured by the second device for the first device may not exceed the maximum downlink receiving capability of the first device. In this embodiment of this application, the second device has a function that the actual quantity of downlink carriers configured for the first device exceeds the maximum downlink receiving capability of the first device, but this does not necessarily mean that "the actual quantity of downlink carriers configured by the second device for the first device exceeds the maximum downlink receiving capability of the first device". Specifically, the actual quantity of downlink carriers configured by the second device for the first device needs to be determined based on an application scenario. Similarly, J indicated by the second configuration information may be greater than K, but this does not necessarily mean that "J indicated by the second configuration information needs to be greater than K". J indicated by the second configuration information may alternatively be less than or equal to K. This is not limited herein.

In some embodiments of this application, the second device may configure at least J downlink carriers for the first device. To be specific, the second device may configure J downlink carriers for the first device, or the second device may configure J+1 downlink carriers for the first device, or the second device may configure J+2 downlink carriers for the first device. In this embodiment of this application, the actual quantity of downlink carriers configured by the second device for the first device is not limited. In particular, J=3, or J=K.

In some embodiments of this application, in addition to step 401 performed by the second device, the information transmission method provided in this embodiment of this application further includes:

The second device receives second capability information from the first device; and the second device determines, based on the second capability information, that the first device can determine, from downlink carriers whose quantity is greater than K, a downlink carrier used for receiving information; and/or the second device determines, based on the second capability information, that the first device can determine, from a maximum of V downlink carriers, a downlink carrier used for receiving information, and at least one element in a value set of V is a positive integer greater than K; and/or the second device determines K based on the second capability information; and/or the second device determines, based on the second capability information, that the first device can support determining, from a maximum of B enabled downlink carriers, a downlink carrier used for receiving information. For example, B is a positive integer greater than K.

In some embodiments of this application, in addition to step 411 performed by the first device, the information transmission method provided in this embodiment of this application further includes:

the first device sends the second capability information to the second device, where the second capability information indicates that the first device can determine, from downlink carriers whose quantity is greater than K, a downlink carrier used for receiving information; and/or the second capability information indicates that the first device can determine, from a maximum of V downlink carriers, a downlink carrier used for receiving information, and at least one element in a value set of V is a positive integer greater than K; and/or the second capability information indicates K; and/or the second capability information indicates that the first device can support determining, from a maximum of B enabled downlink carriers, a downlink carrier used for receiving information. For example, B is a positive integer greater than K.

The first device generates the second capability information, and sends the second capability information to the second device. The second capability information indicates a downlink carrier support capability of the first device, so that the second device determines the downlink carrier support capability of the first device based on the received second capability information. The second device may configure an actual quantity of downlink carriers for the first device based on the downlink carrier support capability of the first device.

Specifically, the second capability information may indicate capabilities of a plurality of downlink carriers of the first device. For example, the second capability information indicates that the first device can determine, from the downlink carriers whose quantity is greater than K, the downlink carrier used for receiving information. The second capability information reflects that the first device has a capability of determining, from the downlink carriers whose quantity is greater than K, the downlink carrier used for receiving information. To be specific, the second device may determine, based on the second capability information, that the first device can determine, from the downlink carriers whose quantity is greater than K, the downlink carrier used for receiving information. The reflection means that the second capability information may be used for direct indication, or the second capability information may be used for indirect indication, explicit indication, implicit indication, or the like. In addition, the second capability information indicates that the first device can determine, from the downlink carriers whose quantity is greater than K, the downlink carrier used for receiving information. The indication herein may be a direct indication, an indirect indication, an explicit indication, an implicit indication, or the like. The second capability information reflects that "the first device can determine, from the downlink carriers whose quantity is greater than K, the downlink carrier used for receiving information", and "the first device can determine, from the downlink carriers whose quantity is greater than K, the downlink carrier used for receiving information" is a result reflected by the second capability information. The second capability information may directly indicate the result, or may indirectly indicate the result. This is not limited herein. For descriptions of "reflection" in subsequent embodiments, refer to this embodiment. "Reflection" is not described in detail subsequently.

In this embodiment of this application, determining the downlink carrier used for receiving information means that the first device determines a potential or candidate downlink carrier that can be used for downlink reception, and is not a downlink carrier on which the first device can actually perform concurrent downlink reception. The first device may determine, from candidate downlink carriers, a downlink carrier on which concurrent downlink reception can be actually performed. That is, determining the downlink carrier used for receiving information is determining a downlink carrier that may be used for actual downlink transmission. Alternatively, a quantity of candidate downlink carriers may exceed a maximum quantity of downlink carriers on which the first device can actually perform concurrent downlink reception.

In some embodiments of this application, the second device can configure a maximum of Q downlink carriers for the first device, and Q is a positive integer greater than K.

The second device can configure the maximum of Q downlink carriers for the first device. That is, the second device has a capability of configuring the maximum quantity of Q downlink carriers for the first device, and Q is greater than K. For example, a value of K is 3, and a value of Q may be 4. Optionally, the first configuration information may indicate that the second device can configure the maximum of Q downlink carriers for the first device. In other words, the first configuration information can be used for configuring the maximum of Q downlink carriers for user equipment, and the maximum quantity of downlink carriers on which the first device can simultaneously perform downlink reception is K. Q is a positive integer greater than 1, and K is a positive integer less than Q.

In some embodiments of this application, the second capability information is used for enabling the second device to determine that the first device supports that a quantity of downlink carriers configured by the second device for the first device can be greater than K; and/or the second capability information is used for enabling the second device to determine that the first device can support a maximum quantity V of downlink carriers configured by the second device for the first device; and/or the second capability information is used for enabling the second device to determine that a maximum quantity of downlink carriers on which the first device can simultaneously perform downlink reception is K; and/or the second capability information is used for enabling the second device to determine that the first device can support determining, from a maximum of B enabled downlink carriers, a downlink carrier used for receiving information. For example, B is a positive integer greater than K.

Specifically, the second capability information indicates that the first device can determine, from the downlink carriers whose quantity is greater than K, the downlink carrier used for sending information. Therefore, the second device determines, based on the received second capability information, that the quantity of downlink carriers that the first device supports the second device to configure for the first device can be greater than K, and the second device may configure an actual quantity of downlink carriers for the first device based on the downlink carrier support capability of the first device.

Specifically, the second capability information indicates that the first device can support determining, from the maximum of V downlink carriers, the downlink carrier used for sending information. In this way, the second device determines, based on the received second capability information, that the maximum quantity of downlink carriers that the first device can support the second device to configure for the first device is V, and the second device may configure the actual quantity of downlink carriers for the first device based on the downlink carrier support capability of the first device.

Specifically, the second capability information indicates K, so that the second device determines, based on the received second capability information, that the maximum quantity of downlink carriers on which the first device can simultaneously perform downlink reception is K. The second device may configure the actual quantity of downlink carriers for the first device based on the downlink carrier support capability of the first device.

For example, the first device is user equipment, and the second device is a peer device of the user equipment. For example, the peer device may be a base station, or the peer device is a machine type communication terminal, or the peer device is a communication terminal used for an internet of vehicles service. The user equipment may further report the second capability information to the network device. The second capability information is used by the peer device to determine that the user equipment supports a quantity Q of downlink carriers configured by the peer device for the user equipment, and Q is equal to K; or the user equipment supports a quantity Q of downlink carriers configured by the peer device for the user equipment, and Q is greater than K. K is a maximum quantity of downlink carriers on which the user equipment can simultaneously transmit downlink information.

Specifically, the first capability information indicates that the first device can support determining, from a maximum of B enabled downlink carriers, a downlink carrier used for receiving information. For example, B is a positive integer greater than K. Enabling means that the second device activates a downlink carrier, or the second device configures a downlink carrier to enable the carrier to be used by the first device. Based on the first capability information, the second device may determine that the first device can support the maximum of B enabled downlink carriers, and the second device may determine, from the maximum of B enabled downlink carriers, a downlink carrier available to the first device.

In some embodiments of this application, in addition to step 401 performed by the second device, the information transmission method provided in this embodiment of this application further includes:

The second device sends fourth configuration information to the first device. The fourth configuration information indicates a downlink carrier enabled by the second device for the first device and/or a quantity of downlink carriers enabled by the second device for the first device, and the quantity of downlink carriers enabled by the second device for the first device can be greater than K.

In addition to sending the second configuration information to the first device, the second device may further send the fourth configuration information to the first device. The second configuration information and the fourth configuration information may be sent to the first device simultaneously. For example, the second device includes the second configuration information and the fourth configuration information by using one piece of signaling or an information element or a field. Alternatively, the second configuration information and the fourth configuration information may be separately sent to the first device by using different pieces of signaling or different information elements or different fields. This is not limited herein.

In this embodiment of this application, the fourth configuration information indicates the downlink carrier enabled by the second device for the first device and/or the quantity of downlink carriers enabled by the second device for the first device. For example, the fourth configuration information may directly indicate a downlink carrier enabled by the second device for the first device and/or a quantity of downlink carriers enabled by the second device for the first device. The first device determines, based on the fourth configuration information, the downlink carrier enabled by the second device for the first device and/or the quantity of downlink carriers enabled by the second device for the first device. For another example, the fourth configuration information may directly indicate a disabled downlink carriers and/or a quantity of disabled downlink carriers. The first device determines the disabled downlink carriers and/or the quantity of disabled downlink carriers based on the fourth configuration information, and then determines a quantity of enabled downlink carriers based on a total quantity of downlink carriers and the quantity of disabled downlink carriers. The quantity of downlink carriers enabled by the second device for the first device may be greater than K, and a specific value of the quantity of downlink carriers enabled by the second device for the first device is not limited.

402: The second device determines W downlink carriers from the J downlink carriers. W is a positive integer less than or equal to K. The W downlink carriers are used for sending information. For example, the second device sends information to the first device by using a downlink carrier, or the third device sends information to the first device by using a downlink carrier, or the second device and the third device send information to the first device by using a downlink carrier.

412: The first device determines the W downlink carriers from the J downlink carriers. W is a positive integer less than or equal to K.

In this embodiment of this application, after the first device determines, based on the second configuration information, that the second device configures the J downlink carriers for the first device, the first device may further determine a downlink carrier that can be actually used by the first device. For example, the first device performs carrier selection, and determines a downlink carrier that can be actually used by the first device, and then the first device notifies the second device of the downlink carrier that can be actually used by the first device. For another example, the first device receives a notification from the second device, and determines, based on the notification, a downlink carrier that can be actually used by the first device.

In some embodiments of this application, step 412 in which the first device determines the W downlink carriers from the J downlink carriers includes:

The first device receives the fourth configuration information from the second device, where the fourth configuration information indicates a downlink carrier enabled by the second device for the first device and/or a quantity of downlink carriers enabled by the second device for the first device, and the quantity of downlink carriers enabled by the second device for the first device can be greater than K;

the first device determines the W downlink carriers from downlink carriers enabled by the second device for the first device.

In this embodiment of this application, the fourth configuration information indicates the quantity of downlink carriers enabled by the second device for the first device. For example, the fourth configuration information may directly indicate the quantity of downlink carriers enabled by the second device for the first device, and the first device determines, based on the fourth configuration information, the downlink carrier enabled by the second device for the first device and/or the quantity of downlink carriers enabled by the second device for the first device. For another example, the fourth configuration information may directly indicate a quantity of disabled downlink carriers. The first device determines the quantity of disabled downlink carriers based on the fourth configuration information, and then determines a quantity of enabled downlink carriers based on a total quantity of downlink carriers and the quantity of disabled downlink carriers. The quantity of downlink carriers enabled by the second device for the first device may be greater than K, and a specific value of the quantity of downlink carriers enabled by the second device for the first device is not limited.

For example, the second device configures J downlink carriers for the first device, and J=5. K is a maximum quantity of downlink carriers on which the first device can simultaneously perform downlink transmission, and K=3. The third configuration information indicates that the second device enables four downlink carriers for the first device. In this case, the first device determines W downlink carriers from the four enabled downlink carriers, and W=2. Therefore, the first device may determine two downlink carriers from the four enabled downlink carriers. The two downlink carriers are downlink carriers used by the first device for downlink transmission. In this embodiment of this application, the first terminal device has a capability of flexibly selecting a carrier from more carriers beyond a downlink concurrency capability of the first terminal device. Therefore, the first device can flexibly use spectrum resources.

In a subsequent embodiment, the second device sending information to the first device by using a downlink carrier is used as an example. There is no limitation that in this embodiment of this application, the third device may alternatively send information to the first device by using a downlink carrier, or the second device and the third device send information to the first device by using a downlink carrier. For example, the second device is a macro base station, and the third device is a micro base station.

403: The second device sends information to the first device on the W downlink carriers.

413: The first device receives the information from the second device on the W downlink carriers.

In this embodiment of this application, the first device determines that the W downlink carriers are downlink carriers used by the first device for downlink reception, and the first device may perform downlink information transmission with the second device on the W downlink carriers. For example, the first device sends information to the second device on the W downlink carriers, so that the first device can communicate with the second device.

In some embodiments of this application, T is greater than J, and J is a quantity of downlink carriers configured by the second device for the first device; and/or L is greater than K, and K is a maximum quantity of downlink carriers on which the first device can simultaneously perform downlink reception.

In some embodiments of this application, M is greater than Q, and Q is a maximum quantity of downlink carriers that can be configured by the second device for the first device.

For example, in embodiments of this application, the first device is user equipment, and the second device is a peer device of the user equipment. For example, the peer device may be a base station, or the peer device is a machine type communication terminal, or the peer device is a communication terminal used for an internet of vehicles service. In an application scenario, a quantity of downlink carriers configured by the peer device for the user equipment is less than a quantity of uplink carriers configured by the peer device for the user equipment. That is, T is greater than J, and/or Q is less than M. For example, in this embodiment of this application, a typical application scenario is that a quantity of downlink carriers on which the user equipment can simultaneously perform concurrent receiving is less than a quantity of uplink carriers on which the user equipment can simultaneously perform concurrent sending. That is, K is less than L.

In this embodiment of this application, M may be greater than Q. In other words, uplink and downlink carriers do not need to be paired. This resolves a limitation on spectrum resource utilization. A maximum quantity of carriers for concurrent downlink reception of the user equipment is less than a maximum quantity of concurrent uplink carriers of the user equipment. This does not increase complexity of the user equipment, is applicable to an uplink-dominant service and meets a requirement of the user equipment for more uplink carriers.

In this embodiment of this application, the user equipment notifies the peer device that the user equipment has a capability of flexibly selecting a carrier from more carriers beyond an uplink concurrency capability and/or a concurrent receiving capability of the user equipment. The peer device may configure, for the user equipment, more uplink carriers that exceed a concurrency capability of the peer device, or configure more downlink carriers that exceed concurrent receiving of the peer device. The user equipment flexibly selects a carrier from more carriers, selects an optimal carrier resource, increases a rate, reduces complexity of the user equipment, and reduces power consumption of the user equipment. For example, in this embodiment of this application, uplink concurrency complexity and/or downlink concurrent receiving complexity of the user equipment are reduced.

It should be noted that, for brevity, the foregoing method embodiments are represented as a series of actions. However, a person skilled in the art should appreciate that embodiments of this application is not limited to the order of the described actions, because according to embodiments of this application, some steps may adopt other order or occur simultaneously. In addition, a person skilled in the art should also appreciate that all the embodiments described in the specification are example embodiments, and the related actions and modules are not necessarily mandatory to embodiments of this application.

To better implement the solutions of embodiments of this application, a related apparatus for implementing the solutions is further provided below.

FIG. 5 is a communication apparatus 500 according to an embodiment of this application. The communication apparatus 500 may be a terminal device, or may be an apparatus in a terminal device, or an apparatus that can be used together with the terminal device. FIG. 5 shows an example in which the communication apparatus 500 is a terminal device. For example, the terminal device may be the foregoing first device. The first device may include a transceiver module 501 and a processing module 502.

In a possible implementation, the transceiver module is configured to receive first configuration information from a second device, where the first configuration information instructs the second device to configure T uplink carriers for the first device, at least one element in a value set of T is a positive integer greater than L, and L is a maximum quantity of uplink carriers on which the first device can simultaneously perform uplink transmission;

the processing module is configured to determine N uplink carriers from the T uplink carriers, where N is a positive integer less than or equal to L; and the transceiver module is configured to send information on the N uplink carriers.

In a possible implementation, the transceiver module is configured to report first capability information to the second device.

The first capability information indicates that the first device can determine, from uplink carriers whose quantity is greater than L, an uplink carrier used for sending information; and/or the first capability information indicates that the first device can support determining, from a maximum of S uplink carriers, an uplink carrier used for sending information, and at least one element in a value set of S is a positive integer greater than L; and/or the first capability information indicates L.

In a possible implementation, the transceiver module is configured to receive second configuration information from the second device, where the second configuration information instructs the second device to configure J downlink carriers for the first device, at least one element in a value set of J is a positive integer greater than K, and K is a maximum quantity of downlink carriers on which the first device can simultaneously perform downlink reception;

the processing module is configured to determine W downlink carriers from the J downlink carriers, where W is a positive integer less than or equal to K; and the transceiver module is configured to receive information on the W downlink carriers.

In a possible implementation, the transceiver module is configured to send second capability information to the second device.

The second capability information indicates that the first device can determine, from downlink carriers whose quantity is greater than K, a downlink carrier used for receiving information; and/or the second capability information indicates that the first device can determine, from a maximum of V downlink carriers, a downlink carrier used for receiving information, and at least one element in a value set of V is a positive integer greater than K; and/or the second capability information indicates K.

In a possible implementation, the transceiver module is configured to receive third configuration information from the second device, where the third configuration information indicates an uplink carrier enabled by the second device for the first device and/or a quantity of uplink carriers enabled by the second device for the first device, and the quantity of uplink carriers enabled by the second device for the first device can be greater than L; and the processing module is configured to determine the N uplink carriers from uplink carriers enabled by the second device for the first device.

In a possible implementation, the transceiver module is configured to receive fourth configuration information from the second device, where the fourth configuration information indicates a downlink carrier enabled by the second device for the first device and/or a quantity of downlink carriers enabled by the second device for the first device, and the quantity of downlink carriers enabled by the second device for the first device can be greater than K; and the processing module is configured to determine the W downlink carriers from downlink carriers enabled by the second device for the first device.

In a possible implementation, T is greater than J, and J is a quantity of downlink carriers configured by the second device for the first device; and/or L is greater than K, and K is a maximum quantity of downlink carriers on which the first device can simultaneously perform downlink reception.

Figure 6:
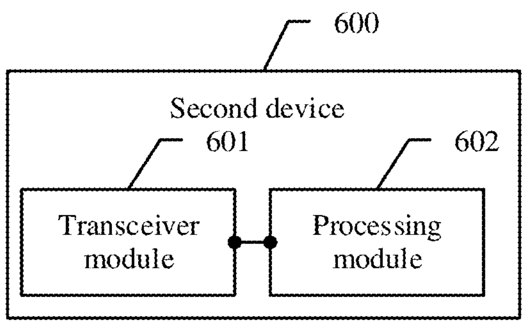
FIG. 6 is a schematic diagram of a composition structure of a second device according to an embodiment of this application.

FIG. 6 is a communication apparatus 600 according to an embodiment of this application. The communication apparatus 600 may be a network device, or may be an apparatus in a network device, or an apparatus that can be used together with the network device. FIG. 6 shows an example in which the communication apparatus 600 is a network device. For example, the network device may be the foregoing second device. The second device may include a transceiver module 601 and a processing module 602.

In a possible implementation, the transceiver module is configured to send first configuration information to a first device, where the first configuration information instructs the second device to configure T uplink carriers for the first device, at least one element in a value set of T is a positive integer greater than L, and L is a maximum quantity of uplink carriers on which the first device can simultaneously perform uplink transmission; and the processing module is configured to determine N uplink carriers from the T uplink carriers, where N is a positive integer less than or equal to L, and the N uplink carriers are used for receiving information from the first device.

In a possible implementation, the transceiver module is configured to receive first capability information from the first device; and the processing module is configured to determine, based on the first capability information, that the first device can determine, from uplink carriers whose quantity is greater than L, an uplink carrier used for sending information; and/or determine, based on the first capability information, that the first device can support determining, from a maximum of S uplink carriers, an uplink carrier used for sending information, and at least one element in a value set of S is a positive integer greater than L; and/or determine L based on the first capability information.

In a possible implementation, the transceiver module is configured to send second configuration information to the first device, where the second configuration information instructs the second device to configure J downlink carriers for the first device, at least one element in a value set of J is a positive integer greater than K, and K is a maximum quantity of downlink carriers on which the first device can simultaneously perform downlink reception; and the processing module is configured to determine W downlink carriers from the J downlink carriers, where W is a positive integer less than or equal to K, and the W downlink carriers are used for sending information.

In a possible implementation, the transceiver module is configured to receive second capability information from the first device; and the processing module is configured to determine, based on the second capability information, that the first device can determine, from downlink carriers whose quantity is greater than K, a downlink carrier used for receiving information; and/or determine, based on the second capability information, that the first device can determine, from a maximum of V downlink carriers, a downlink carrier used for receiving information, and at least one element in a value set of V is a positive integer greater than K; and/or determine K based on the second capability information.

In a possible implementation, the transceiver module is configured to send third configuration information to the first device, where the third configuration information indicates an uplink carrier enabled by the second device for the first device and/or a quantity of uplink carriers enabled by the second device for the first device, and the quantity of uplink carriers enabled by the second device for the first device can be greater than L.

In a possible implementation, the transceiver module is configured to send fourth configuration information to the first device, where the fourth configuration information indicates a downlink carrier enabled by the second device for the first device and/or a quantity of downlink carriers enabled by the second device for the first device, and the quantity of downlink carriers enabled by the second device for the first device can be greater than K.

In a possible implementation, T is greater than J, and J is a quantity of downlink carriers configured by the second device for the first device; and/or L is greater than K, and K is a maximum quantity of downlink carriers on which the first device can simultaneously perform downlink reception.

Figure 7:
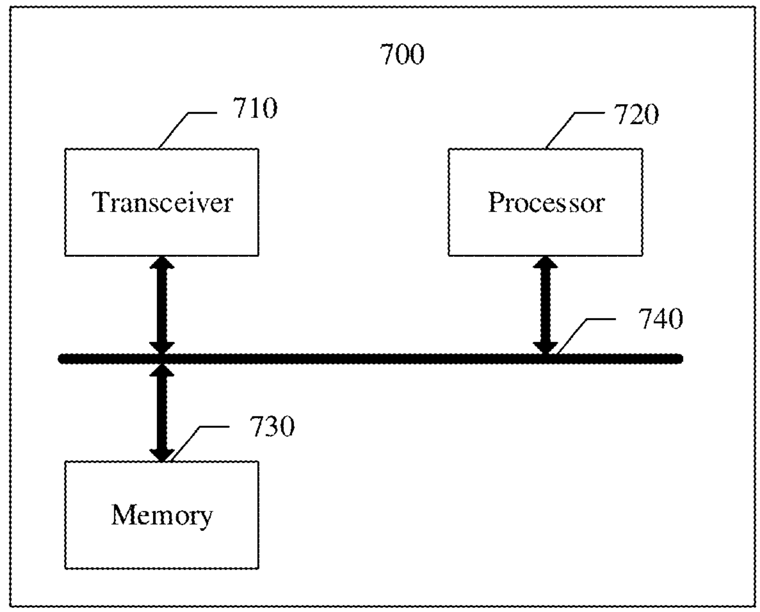
FIG. 7 is a schematic diagram of a composition structure of a first device according to an embodiment of this application.

FIG. 7 shows an apparatus 700 according to an embodiment of this application. The apparatus 700 is configured to implement functions of the first device in the foregoing method. The apparatus may be a first device, or may be an apparatus in the first device, or an apparatus that can be used together with the first device. The apparatus may be a chip system. In this embodiment of this application, the chip system may include a chip, or may include a chip and another discrete component. The apparatus 700 includes at least one processor 720, configured to implement functions of the first device in the method provided in embodiments of this application. For example, the processor 720 may receive information such as downlink control information and configuration information of a control resource set, and parse the foregoing information. For details, refer to detailed descriptions in the method example. Details are not described herein again.

The apparatus 700 may further include at least one memory 730, configured to store a program instruction and/or data. The memory 730 is coupled to the processor 720. The coupling in this embodiment of this application may be an indirect coupling or a communication connection between apparatuses, units, or modules in an electrical form, a mechanical form, or another form, and is used for information exchange between the apparatuses, the units, or the modules. The processor 720 may cooperate with the memory 730. The processor 720 may execute the program instruction stored in the memory 730. At least one of the at least one memory may be included in the processor, and the apparatus 700 may further include a communication interface. The communication interface may be implemented in a plurality of manners. For example, the communication interface may be a transceiver, an interface, a bus, a circuit, a pin, or an apparatus that can implement a receiving and sending function. In FIG. 7, an example in which the communication interface is a transceiver 710 is used for description. The transceiver 710 is configured to communicate with another device by using a transmission medium, so that the apparatus in the apparatus 700 may communicate with another device. For example, the another device may be a network device. The processor 720 receives and sends data by using the transceiver 710, and is configured to implement the method performed by the first device in the embodiment corresponding to FIG. 3.

A specific connection medium between the transceiver 710, the processor 720, and the memory 730 is not limited in this embodiment of this application. In this embodiment of this application, in FIG. 7, the memory 730, the processor 720, and the transceiver 710 are connected through a bus 740, and the bus is represented by a bold line in FIG. 7. A connection manner between other parts is merely an example for description, and does not impose a limitation. The bus may be classified into an address bus, a data bus, a control bus, and the like. For ease of representation, only one bold line is used for representation in FIG. 7, but this does not mean that there is only one bus or only one type of bus.

Figure 8:
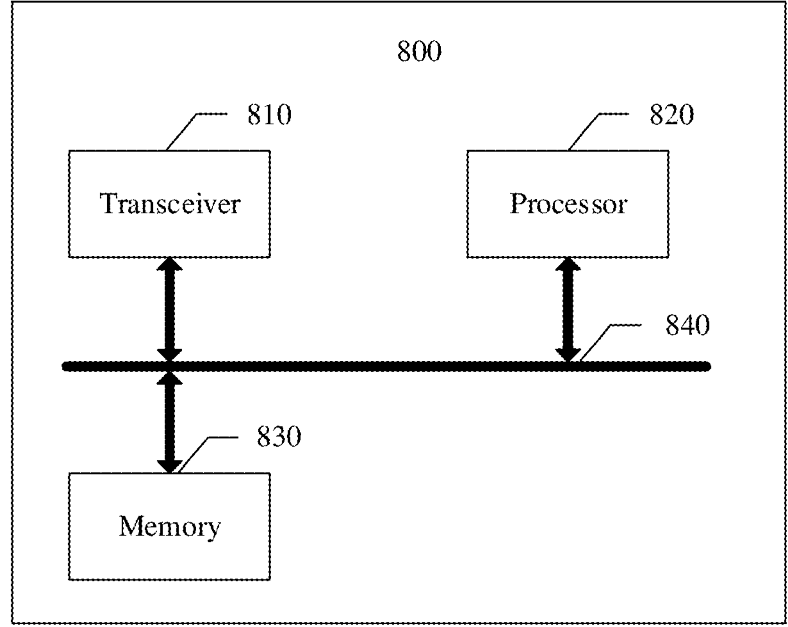
FIG. 8 is a schematic diagram of a composition structure of a second device according to an embodiment of this application.

FIG. 8 shows an apparatus 800 according to an embodiment of this application. The apparatus 800 is configured to implement functions of the second device in the foregoing method. The apparatus may be a second device, or may be an apparatus in the second device, or an apparatus that can be used together with the second device. The apparatus may be a chip system. The apparatus 800 includes at least one processor 820, configured to implement functions of the second device in the method provided in embodiments of this application. For example, the processor 820 may generate and send information such as downlink control information and configuration information of a control resource set. For details, refer to detailed descriptions in the method example. Details are not described herein again.

The apparatus 800 may further include at least one memory 830, configured to store program instructions and/or data. The memory 830 is coupled to the processor 820. The coupling in this embodiment of this application may be an indirect coupling or a communication connection between apparatuses, units, or modules in an electrical form, a mechanical form, or another form, and is used for information exchange between the apparatuses, the units, or the modules. The processor 820 may cooperate with the memory 830. The processor 820 may execute the program instructions stored in the memory 830. At least one of the at least one memory may be included in the processor, and the apparatus 800 may further include a communication interface. The communication interface may be implemented in a plurality of manners. For example, the communication interface may be a transceiver, an interface, a bus, a circuit, or an apparatus that can implement a receiving and sending function. In FIG. 8, an example in which the communication interface is a transceiver 810 is used for description. The transceiver 810 is configured to communicate with another device by using a transmission medium, so that the apparatus in the apparatus 800 may communicate with another device. For example, the another device may be a terminal device. The processor 820 receives and sends data by using the transceiver 810, and is configured to implement the method performed by the second device in the embodiment corresponding to FIG. 3.

In this embodiment of this application, a specific connection medium between the transceiver 810, the processor 820 and the memory 830 is not limited. In this embodiment of this application, in FIG. 8, the memory 830, the processor 820, and the transceiver 810 are connected through a bus 840, and the bus is represented by a bold line in FIG. 8. A connection manner between other parts is merely an example for description, and does not impose a limitation. The bus may be classified into an address bus, a data bus, a control bus, and the like. For ease of representation, only one bold line is used for representation in FIG. 8, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (HDD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or a part of the technical solutions provided in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a second device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, on the premise that there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

It is clearly that, a person skilled in the art can make various modifications and variations to this application without departing from the scope of this application. In this case, this application is intended to cover these modifications and variations of this application provided that they fall within the scope of protection defined by the following claims and their equivalent technologies.

What is claimed is:

1. An information transmission method, wherein the method comprises:

receiving first configuration information from a second device, wherein the first configuration information instructs the second device to configure T uplink carriers for a first device, wherein the T uplink carriers are used for uplink carrier switching, at least one element in a value set of T is a positive integer greater than L, and L is a maximum quantity of uplink carriers on which the first device is configured to simultaneously perform uplink transmission;

determining N uplink carriers from the T uplink carriers, wherein N is a positive integer less than or equal to L; and sending information on the N uplink carriers, wherein the method further comprises reporting first capability information to the second device, the first capability information indicates that the first device is capable of determining, from uplink carriers whose quantity is greater than L, an uplink carrier for sending information, and the determining the N uplink carriers from the T uplink carriers comprises determining, by the first device, the N uplink carriers based on received one or more pieces of indication information or downlink control information sent by the second device to the first device.

2. The method according to claim 1, wherein the method further comprises:

receiving second configuration information from the second device, wherein the second configuration information instructs the second device to configure J downlink carriers for the first device, at least one element in a value set of J is a positive integer greater than K, and K is a maximum quantity of downlink carriers on which the first device is configured to simultaneously perform downlink reception;

determining W downlink carriers from the J downlink carriers, wherein W is a positive integer less than or equal to K; and receiving information on the W downlink carriers.

3. The method according to claim 1, wherein the determining the N uplink carriers from the T uplink carriers comprises:

receiving third configuration information from the second device, wherein the third configuration information indicates at least one of:

an uplink carrier enabled by the second device for the first device, or a quantity of uplink carriers enabled by the second device for the first device, wherein L is exceedable by the quantity of uplink carriers enabled by the second device for the first device; and determining the N uplink carriers from uplink carriers enabled by the second device for the first device.

4. The method according to claim 1, wherein at least one of:

T is greater than J, and J is a quantity of downlink carriers configured by the second device for the first device; or L is greater than K, and K is a maximum quantity of downlink carriers on which the first device is configured to simultaneously perform downlink reception.

5. The method according to claim 1, wherein the determining the N uplink carriers from the T uplink carriers comprises determining, by the first device, the N uplink carriers based on the received one or more pieces of the indication information sent by the second device to the first device.

6. The method according to claim 1, wherein the determining the N uplink carriers from the T uplink carriers comprises determining, by the first device, the N uplink carriers based on the received one or more pieces of the downlink control information sent by the second device to the first device.

7. An information transmission method, wherein the method comprises:

sending first configuration information to a first device, wherein the first configuration information instructs a second device to configure T uplink carriers for the first device, wherein the T uplink carriers are used for uplink carrier switching, at least one element in a value set of T is a positive integer greater than L, and L is a maximum quantity of uplink carriers on which the first device is configured to simultaneously perform uplink transmission; and receiving information from the first device on N uplink carriers determined by the first device from the T uplink carriers, wherein N is a positive integer less than or equal to L, wherein the method further comprises:

receiving first capability information from the first device;

determining, based on the first capability information, that the first device is capable of determining, from uplink carriers whose quantity is greater than L, an uplink carrier for sending information; and sending, by the second device to the first device, one or more pieces of indication information or downlink control information, wherein the first device is configured to determine the N uplink carriers from the T uplink carriers based on the one or more pieces of the indication information or the downlink control information sent by the second device to the first device.

8. The method according to claim 7, wherein the method further comprises:

sending second configuration information to the first device, wherein the second configuration information instructs the second device to configure J downlink carriers for the first device, at least one element in a value set of J is a positive integer greater than K, and K is a maximum quantity of downlink carriers on which the first device is configured to simultaneously perform downlink reception; and determining, from the J downlink carriers, W downlink carriers for sending information, wherein W is a positive integer less than or equal to K.

9. The method according to claim 7, wherein the method further comprises:

sending third configuration information to the first device, wherein the third configuration information indicates at least one of:

an uplink carrier enabled by the second device for the first device, or a quantity of uplink carriers enabled by the second device for the first device, wherein L is exceedable by the quantity of uplink carriers enabled by the second device for the first device.

10. The method according to claim 7, wherein at least one of:

T is greater than J, and J is a quantity of downlink carriers configured by the second device for the first device; or L is greater than K, and K is a maximum quantity of downlink carriers on which the first device is configured to simultaneously perform downlink reception.

11. A communication apparatus, comprising:

a non-transitory memory storage comprising instructions; and one or more processors in communication with the memory storage, wherein the instructions are executable by the one or more processors to cause the apparatus to:

receive first configuration information from a second device, wherein the first configuration information instructs the second device to configure T uplink carriers for the communication apparatus which is a first device, wherein the T uplink carriers are used for uplink carrier switching, at least one element in a value set of T is a positive integer greater than L, and L is a maximum quantity of uplink carriers on which the first device is configured to simultaneously perform uplink transmission;

determine N uplink carriers from the T uplink carriers, wherein N is a positive integer less than or equal to L; and send information on the N uplink carriers, wherein the instructions are executable by the one or more processors to further cause the apparatus to report first capability information to the second device, wherein the first capability information indicates that the first device is capable of determining, from uplink carriers whose quantity is greater than L, an uplink carrier for sending information; and determine the N uplink carriers from the T uplink carriers based on received one or more pieces of indication information or downlink control information sent by the second device to the first device.

12. The communication apparatus according to claim 11, wherein the instructions, when executed by the one or more processors, further cause the apparatus to:

receive second configuration information from the second device, wherein the second configuration information instructs the second device to configure J downlink carriers for the first device, at least one element in a value set of J is a positive integer greater than K, and K is a maximum quantity of downlink carriers on which the first device is configured to simultaneously perform downlink reception;

determine W downlink carriers from the J downlink carriers, wherein W is a positive integer less than or equal to K; and receive information on the W downlink carriers.

13. The communication apparatus according to claim 11, wherein the instructions, when executed by the one or more processors, further cause the apparatus to:

receive third configuration information from the second device, wherein the third configuration information indicates at least one of:

an uplink carrier enabled by the second device for the first device, or a quantity of uplink carriers enabled by the second device for the first device, wherein L is exceedable by the quantity of uplink carriers enabled by the second device for the first device; and determine the N uplink carriers from uplink carriers enabled by the second device for the first device.

14. The communication apparatus according to claim 11, wherein at least one of:

T is greater than J, and J is a quantity of downlink carriers configured by the second device for the first device; or L is greater than K, and K is a maximum quantity of downlink carriers on which the first device is configured to simultaneously perform downlink reception.

15. A communication apparatus, comprising:

a non-transitory memory storage comprising instructions; and one or more processors in communication with the memory storage, wherein the instructions are executable by the one or more processors to cause the apparatus to:

send first configuration information to a first device, wherein the first configuration information instructs the communication apparatus which is a second device to configure T uplink carriers for the first device, wherein the T uplink carriers are used for uplink carrier switching, at least one element in a value set of T is a positive integer greater than L, and L is a maximum quantity of uplink carriers on which the first device is configured to simultaneously perform uplink transmission; and receive information from the first device on N uplink carriers determined by the first device from the T uplink carriers, wherein N is a positive integer less than or equal to L, wherein the instructions are executable by the one or more processors to further cause the apparatus to:

receive first capability information from the first device;

determine, based on the first capability information, that the first device is capable of determining, from uplink carriers whose quantity is greater than L, an uplink carrier for sending information; and send, to the first device, one or more pieces of indication information or downlink control information, wherein the first device is configured to determine the N uplink carriers from the T uplink carriers based on the one or more pieces of the indication information or the downlink control information sent by the second device to the first device.

16. The communication apparatus according to claim 15, wherein the instructions, when executed by the one or more processors, further cause the apparatus to:

send second configuration information to the first device, wherein the second configuration information instructs the second device to configure J downlink carriers for the first device, at least one element in a value set of J is a positive integer greater than K, and K is a maximum quantity of downlink carriers on which the first device is configured to simultaneously perform downlink reception; and determine, from the J downlink carriers, W downlink carriers for sending information, wherein W is a positive integer less than or equal to K.

17. The communication apparatus according to claim 15, wherein the instructions, when executed by the one or more processors, further cause the apparatus to:

send third configuration information to the first device, wherein the third configuration information indicates at least one of:

an uplink carrier enabled by the second device for the first device, or a quantity of uplink carriers enabled by the second device for the first device, wherein L is exceedable by the quantity of uplink carriers enabled by the second device for the first device.

18. The communication apparatus according to claim 15, wherein at least one of:

T is greater than J, and J is a quantity of downlink carriers configured by the second device for the first device; or L is greater than K, and K is a maximum quantity of downlink carriers on which the first device is configured to simultaneously perform downlink reception.

* * * * *